(12) United States Patent
Takano et al.

(10) Patent No.: US 6,315,459 B1
(45) Date of Patent: Nov. 13, 2001

(54) SYNTHETIC RESIN CAGE FOR ROLLER BEARING

(75) Inventors: Susumu Takano; Yukio Ohura, both of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/164,676

(22) Filed: Oct. 1, 1998

(30) Foreign Application Priority Data

Oct. 1, 1997 (JP) .................................................. 9-268424
Jun. 22, 1998 (JP) ................................................ 10-174635

(51) Int. Cl.$^7$ .................................................. F16C 33/46
(52) U.S. Cl. ................................................ 384/572; 384/580
(58) Field of Search .................................... 384/572, 576, 384/577, 580

(56) References Cited

U.S. PATENT DOCUMENTS

| | | | |
|---|---|---|---|
| 2,977,164 | * | 3/1961 | Witte ..................................... 384/576 |
| 3,975,066 | | 8/1976 | Hofmann et al. . |
| 3,989,326 | * | 11/1976 | Hormann et al. ..................... 384/572 |
| 4,288,129 | * | 9/1981 | Ryanen .................................. 384/576 |
| 4,462,643 | | 7/1984 | Gilbert et al. . |
| 4,812,058 | * | 3/1989 | Hofmann et al. ................ 384/576 X |
| 4,824,265 | * | 4/1989 | Hofmann et al. ................ 384/576 X |
| 5,009,535 | * | 4/1991 | Brockmuller et al. ............... 384/576 |
| 5,352,047 | | 10/1994 | Inagall et al. . |

FOREIGN PATENT DOCUMENTS

| | | |
|---|---|---|
| 1822746 | 9/1960 | (DE) . |
| 105668 | 4/1961 | (DE) . |
| 1625648 | 1/1972 | (DE) . |
| 2110009 | 9/1972 | (DE) . |
| 2441121A1 | 3/1976 | (DE) . |
| 2922361A1 | 12/1980 | (DE) . |
| 296 19 498 | 1/1997 | (DE) . |
| 19604681A1 | 8/1997 | (DE) . |
| 2422063 | 4/1979 | (FR) . |
| 0817744 | 8/1959 | (GB) . |
| 0977552 | 12/1964 | (GB) . |
| 1145680 | 3/1969 | (GB) . |
| 1194294 | 6/1970 | (GB) . |
| 1380454 | 1/1975 | (GB) . |
| 1557316 | 12/1979 | (GB) . |
| 2310009 | 8/1997 | (GB) . |
| 41-21846 | 12/1941 | (JP) . |

\* cited by examiner

*Primary Examiner*—Thomas R. Hannon
(74) *Attorney, Agent, or Firm*—Rosenman & Colin, LLP

(57) ABSTRACT

A synthetic resin cage for use in a bearing is provide to have a circular ring section and a column section with a plurality of columns, wherein only the base ends of the columns (4) are continued to the circular rig section (5) with the tip ends of the columns (4) being free, and some of the columns (4) have their tip ends connected to each other within a circumferential connecting frame portion (8), and e.g. part of the connecting frame portion (8) aces the end face of the rollers (6) to prevent the cage (1a) from dropping out of the bearing.

8 Claims, 29 Drawing Sheets

PRIOR ART

SYNTHETIC RESIN CAGE FOR ROLLER BEARING

FIELD OF THE INVENTION

This invention relates to a synthetic resin cage for a roller bearing, specifically to improvements of a synthetic resin cage built into a roller bearing which supports a rotating body such as the shaft of machine tools, that is driven at high speed while being lubricated with small amounts of grease or lubrication oil.

DESCRIPTION OF THE BACKGROUND

A bearing that is highly rigid and has high rotating precision as well as low heat generation is desired for rotatably supporting the shaft of machine tools in order to improve machining precision. Moreover, in recent years, high-speed stability has been desired in order to improve processing efficiency, so that the equipment can be used at high speeds for long periods off time.

With respect to these characteristics, in order to improve rigidity in the radial direction, use of a cylindrical roller bearing as the bearing has become common. Also, in order to improve the rotating precision, as well as further improve the rigidity in the radial direction, the internal space inside the cylindrical roller bearing is made negative such that a pre-loading is applied to the bearing, However, applying this kind of pre-load creates extremely severe conditions for a bearing such as a roller bearing making it easy for failure such as wearing or seizure of internal parts to occur.

Therefore, rolling bearings for normal industrial machinery are commonly made such that there is still a positive space inside the bearing during operation, which makes it possible to extend the Raking life of the bearing, as well as suppress the drop in bearing function due to disturbances.

Moreover, it is common for the rolling bearings of machine tools to be operated under lubrication conditions such as adding very small amounts of grease or lubrication oil in order to minimize the heat generated during operation. In other words, it is possible to reduce the agitation resistance of the lubricant and the heat generated due to the agitation resistance by keeping the amount of grease or lubricant to the minimum required amount.

There are many problems that must be solved in order to further increase the rotation speed of a rotating body, such as a shaft that is supported by a roller bearing so that it rotates freely, under the strict operating conditions described above. One such problem is the problem of wear of the copper alloy cage that is standardly used in conventional roller bearings.

That is, when a roller bearing is used under the extremely severe conditions described above, the surface around both the inside and outside peripheral of the cage, or the inner surface of the pockets heavily rub against the peripheral surfaces of the races or against the surfaces of the rollers (rolling surface and end surface).

Therefore, since the copper alloy cage, which is soft compared with the hard steel of the bearing which comprises the races and cage, is worn down, and it becomes easy for abrasion powder to be produced from the cage due to the abrasion. Particularly, if grease is used for lubricating the roller beating, this abrasion powder is mixed with the grease (soils the grease), thus causing a reduction in lubrication by the grease. If lubrication is greatly reduced, there is the possibility that the roller bearing could bun to seizure in a short period of time or that other damage could occur due to wear.

Taking these problems into consideration, in recent years, the use of synthetic resin cages in roller bearings for supporting free rotation of rotating bodies that receive large loads, such as the shaft of machine tools, is becoming more common.

Normally, these synthetic resin cages are formed by injection molding of fiber reinforced resin in which an adequate amount of reinforcement material, such as glass fiber, is intermixed with a synthetic resin, such as a polyamide resin, that has superior friction characteristics (wear resistant). In roller bearings with this kind of synthetic resin cage, it is more difficult for abrasion powder to be generated under the severe conditions described above, and thus it is more difficult for damage such as seizure or severe wear to occur.

However, only by changing the material of the cage in the roller bearing for rotatably supporting a rotating body such as the shaft of the machine tools that receives a large load, specifically by just changing it from a copper alloy to a synthetic resin, it may not be possible to adequately maintain reliability and durability of the rotation support. The reason for this is as follows. For synthetic resins such as a glass-fiber reinforced polyamide resin, the rigidity and breaking strength is less than for a copper alloy, Therefore, if the same shape as a conventional copper alloy cage is used, it is difficult to maintain adequate rigidity and strength. For this reason, the shape and dimensions of the synthetic resin cage are made thicker and larger than the conventional copper alloy cage Generally, a mold is used in order to form the synthetic resin cage using injection molding, and the shape of the mold is either a radial draw type or axial draw type depending on the shape of the cage to be made. Of these, the axial draw type is made of two mold elements which displaces relative to each other in the axial direction of the synthetic resin cage. Therefore, the shape of the cage to be made is such that the pair of mold elements are removed in the axial direction, or in other words, it must be of a shape such that the pair of mold elements can be separated so that the synthetic resin cage is not scratched after injection molding. On the other hand, the radial draw type of mold comprises a pair of mold elements which move in the radial direction of the synthetic resin cage, and multiple mold elements (usually the same number as there are pockets) that can be freely moved in the radial direction. In this case, it is not necessary that the shape of the synthetic resin cage to be made be such that mold element are removed in the axial direction. In the case of the radial draw type mold, however, manufacture of the mold is complicated, so when compared with the synthetic resin mold made using an axial draw type mold, a high manufacturing cost cannot be avoided.

The synthetic resin cages assembled in the roller bearing have a first and second circular rig sections that are arranged such that they are concentric and parallel with each other and have a space between them. Moreover, multiple columns are aged between the first and second circular ring sections and equally spaced around the circumference, and one end of the columns is formed continuous with the inner side surface of the first ring section, and the other end of the columns is formed continuous with the inner side surface of the second nag section. Also, rollers are rotatably held inside pockets that are formed in the sections surrounded by the opposed surfaces in the circumference direction of the adjacent column sections and the inner side surfaces of the first and second ring sections.

When making a synthetic resin cage for this kind of roller bearing using an axial draw type mold, it is necessary to form. The inner diameter of the 1st ring section so that it is larger than the outer diameter of the second ring section to meet the aforementioned molding restrictions.

On the other hand, if the synthetic resin cage is made using a radial draw type mold, both the first and second ring sections can be made with the same dimensions and shape, It is conventionally supported that if the dimensions and shape of the first and second ring sections are made the same in this way, and if the synthetic resin cage is synthetric with reference to the center along the axial direction, then it. is possible to maintain dynamic balance of the synthetic resin cage when the roller bearing is operated at high speed and the synthetic resin cage is rotated at high speed, and thus to maintain its durability. Therefore, the radial draw type mold has conventionally been used for making the cage built in the roller bearing for rotatably supporting a rotating body that received large loads, such as in the shaft of machine tools, and the synthetic resin cage I having a symmetric shape with reference to the center along the axial direction, as shown in FIG. 31, has been used.

When the synthetic resin cage 1 having a symmetric shape around the center along the axial direction as described above is built into a cylindrical roller bearing which forms the rotation support for a rotating body which receives large loads, such as the shaft of machine tools, the inventors have found through research that not necessarily is it possible to adequately maintain die reliability and durability of the synthetic resin cage 1. The reason for this is as follows.

That is, there is no problem if the roller bearing with synthetic resin cage 1 is installed properly in the rotation support section, however it is not always possible to install it properly. For example, if the adjustment of assembly clearance is inadequate such as when the housing and outlet ring, or the shaft and inner ring are fastened too tightly, there is a possibility that the internal clearance in the roller bearing will shift to the negative side. Moreover, even if the internal clearance of the bearing is proper immediately after assembly, if roller bearing generates excessive heat due to agitation resistance of the lubrication grease during test operation, there is a possibility that the internal clearance of the roller bearing could greatly shift to the negative side while operating If the internal clearance of the roller bearing greatly shifts to the negative side, for example. if the center axis of the inner ring and the center axis of the outer ring are at an angle with each other due to poor installation tolerance, or poor processing precision of the shaft and housing, there is a possibility that the synthetic resin cage 1 could be damaged. That is, in this case, the rotation of the rollers which make up the roller bearing becomes irregular, causing difference in revolution speed of the rollers in one row to occur. As a result, the rolling surfaces of the rollers with differing revolution speeds between the other rollers are pressed against the opposing columns 4, and abnormal forces act in the circumferential direction at these columns 4.

As mentioned above, in the case of the synthetic resin cage 1 that is made using a radial draw type mold and that is symmetrically shaped with reference to the center in the axial direction, both ends of the columns 4 are firmly joined and supported by the first circular ring section 2 and second circular ring section 3. Also, as described above, the thickness of the synthetic resin cage is somewhat increased and the elastic deformation is small, so it is not possible to sufficiently escape the force applied to the columns 4. Therefore, the stresses generated in the synthetic resin cage 1, for example at the portions where the ends of the columns 4 come together with the first circular ring section 2 and second circular ring section 3, become excessive, and there is a further possibility that the synthetic resin cage could be damaged.

SUMMARY OF THE INVENTION

An object of this invention is, taking into consideration these problems, to provide a synthetic resin cage with the reliability and durability unproved to be built into a cylindrical roller bearing that is used for supporting rotating bodies, such as the shaft of machining equipment, that receive large loads and that must be precisely supported.

Another object of this invention is to provide a synthetic resin cage for a cylindrical roller bearing which is effective in controlling functional changes such as quietness and life span that are due to variations in tie operating conditions and assembly conditions of the cylindrical roller bearing.

Another object of this invention is to provide a synthetic resin cage for a cylindrical roller bearing which comprises a circular ring section and a column section having a plurality of columns arranged with a uniform interval in the circumferential direction and connected at one end to the circular ring section and kept free at the other end to enclose a roller between the adjacent columns, such that the connecting portions between the circular ring section and the columns are hardly damaged even when circumferential forces are applied to the columns from the roller between the columns.

DETAILED DESCRIPTION OF THE PREFERRED EMBODIMENTS

Figure 1:
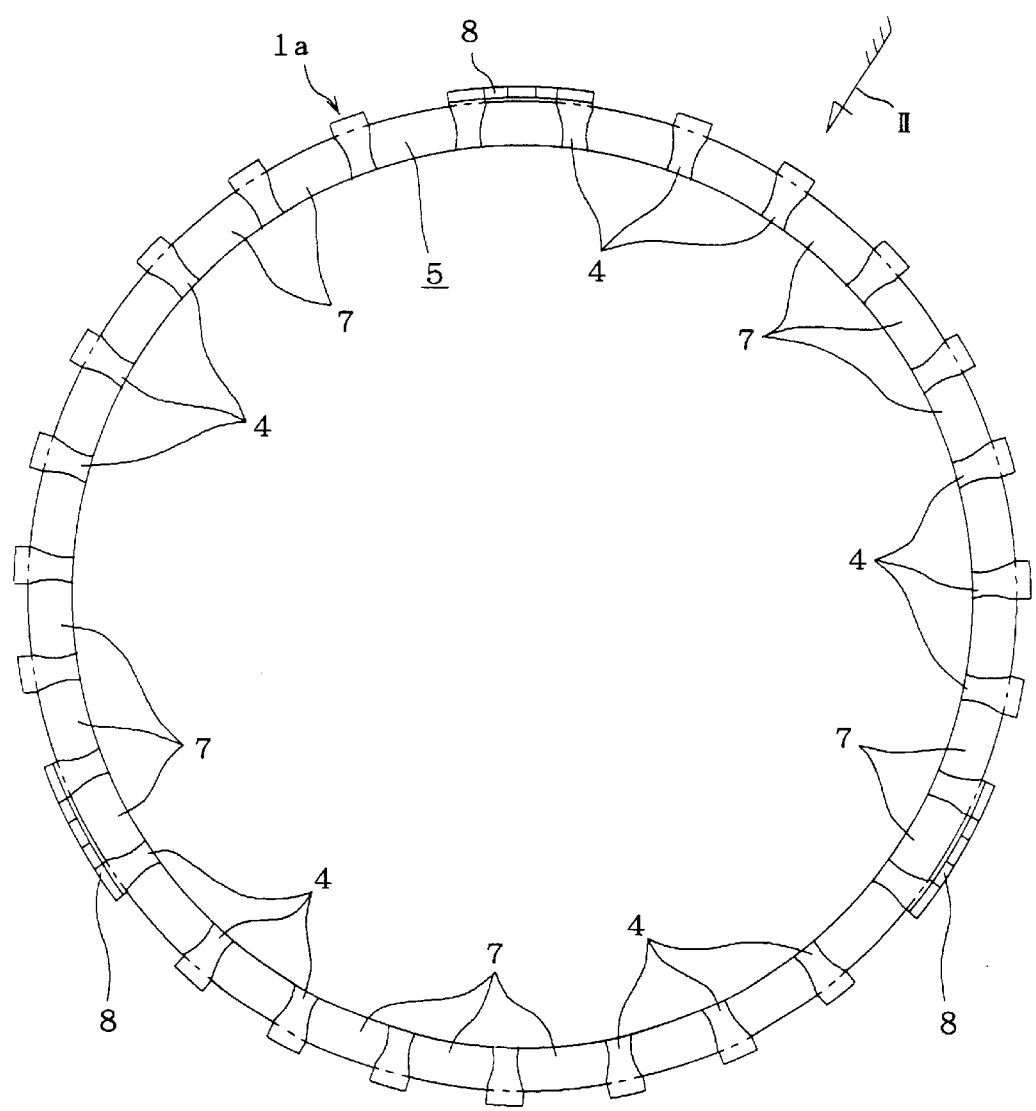
FIG. 1 in an elevational view taken from the side opposite to the circular ring section of the synthetic resin cage on a first example of the embodiments of the present invention.

Of the synthetic resin cages for roller bearings of this invention, the synthetic resin cage for roller bearing in one feature comprises a circular ring section that is located on one end in the axial direction, and a column section with multiple columns that are equally spaced around in the circumferential direction with one end thereof linked with the inner side surface of the circular ring section, such that multiple pockets are surrounded on three sides by opposed sides in the circumferential direction of the adjacent columns and the inner side surface of the circular ring section, respectively, so that rollers are rotatably supported inside, respectively. Also, formed on the other end of a least some of the columns is a retaining piece that prevents the rollers located inside the pockets defined by the columns, from coming out of the pockets.

Moreover, the synthetic resin cage for roller bearing of another feature comprises a circular ring section that is located on one end in the axial direction, a column section with multiple columns that are equally spaced around in the circumferential direction with one end linked with the inner surface of the circular ring section, such that multiple pockets are surrounded on three sides by the opposed side faces in the circumferential direction of the adjacent columns and the inner surface of the circular ring section, respectively, so that rollers are rotatably supported inside, respectively. Particularly, in the synthetic resin cage for roller bearing of this feature, provided on the peripheral surface of at least some of the columns is an anchor section that prevents through engagement with a part of the roller bearing race, the synthetic resin cage for roller bearing from displacing with respect to a roller bearing race at least toward one end.

In either case of a roller bearing assembled with a synthetic resin cage of this invention as described above, excessive stresses do not occur inside the synthetic resin cage, such as in the connection between the column section and the circular ring section, even if the rollers are strongly pressed against the columns during operation. In other words, in either of these roller bearings, even if a roller applies a large force in the circumferential direction on an opposing column, the other end of the column that is not supported by the circular ring section elastically deforms in the circumferential direction while the circular ring that is connected to the one end of the column is plastically deformed to absorb that force. Therefore, excessive stresses inside the synthetic resin cage are prevented from increasing, making it possible to prevent the stresses from becoming large enough to damage the synthetic resin cage. Particularly, since there is a possibility of relatively large plastic deformation, including that of the circular ring section that connects to one end of the columns, even for a short column length, the stresses applied to the columns in the circumferential direction are absorbed smoothly.

As a result, even under variable operating conditions of the roller bearing, and even when the assembly is somewhat improper, machining equipment with a rotation support section of the roller bearings can be operated stably at high speeds for long periods of time.

Moreover, it is possible to maintain the overall strength of the synthetic resin cage by the circular ring section. Even though the columns are easily deformed in the circumferential direction, the overall strength of the synthetic resin cage remains sufficient.

Now, embodiments of the present invention are explained referring to the attached drawings.

Figure 2:
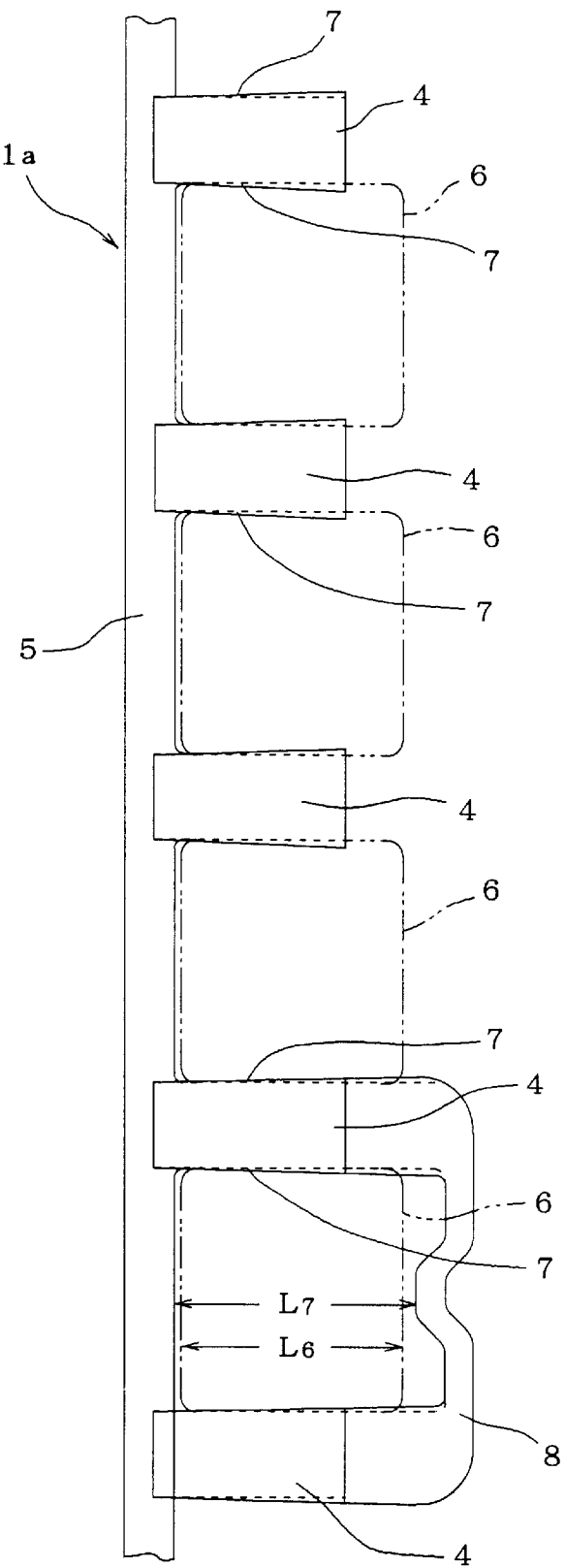
FIG. 2 is an enlarged view taken in the direction of arrow IN of FIG. 1.

FIGS. 1 and 2 show a first embodiment of this invention which corresponds to the first feature In this embodiment of the invention, a thermoplastic synthetic resin, such as polyamide 66, polyamide 46, polyphenylene sulfide or polyacetal, is used as the base material of the synthetic resin cage 1a, and 10 to 30% weight percent of glass fibers are added in order to improve the strength, and the cage is formed using injection molding. However, depending on the use, particularly when plenty of elasticity is desired for the synthetic resin cage I a, it is possible to not add the additive such as glass fibers.

Moreover, in the case of a synthetic resin cage for a cylindrical roller bearing for supporting the shaft of normal machine tools, from the stand point of cost, strength and chemical stability, polyamide 66 is the best material to be used as the base material of the thermoplastic synthetic resin cage.

On the other hand, in the cases of extreme temperature conditions (high temperature) during normal operation or in running-in, or when superior fatigue strength and rigidity are necessary, polyamide 46 is desirable.

And, when stable dimensions are particularly required for high temperature, chemical resistance or humidity (moisture adsorbing), polyphenylene sulfide is desirable, and when resistance to wear is particularly required, polyacetal is most desirable.

In the case of the synthetic resin cage 1a of this embodiment, the twenty seven (27) columns 4 are evenly spaced around the cage 1a in the circumferential direction and supported by one circular ring section 5 located on one end in the axial direction (left end in FIG. 2) using a cantilever method. Also, the section that is surrounded on three sides by the opposed side faces in the circumferential direction of the columns 4, and the inner surface of the circular ring 5, forms pockets 7, and inside them, the rollers 6 are held such that they can rotate freely.

Also, the other ends (right end in FIG. 2) of three pairs or six columns 4, evenly spaced around in the circumferential direction, are connected to each other by a connecting frame 8 that prevents the rollers from falling out. This connecting frame 8 has a smaller cross-sectional area than that of the circular ring 5, and it is bent around in the circumferential direction and its rigidity is reduced in the circumferential direction.

Moreover, in the embodiment shown in the figure, the inner peripheral edge of this connecting frame 8 is located further outside in the radial direction than the outer peripheral edge of the circular ring 5 so that the synthetic resin cage 1 a can be made using an anal draw type mold.

Reducing the rigidity in the circumferential direction of the connecting frame 8 can be performed, in place of bending around in the circumferential direction or together with the bending, by reducing at the portion of connecting frame 8 the amount of reinforcement material, such as glass fiber, that is combined with the synthetic resin, such as a polyamide resin, to form the synthetic resin cage 1a.

Figure 3:
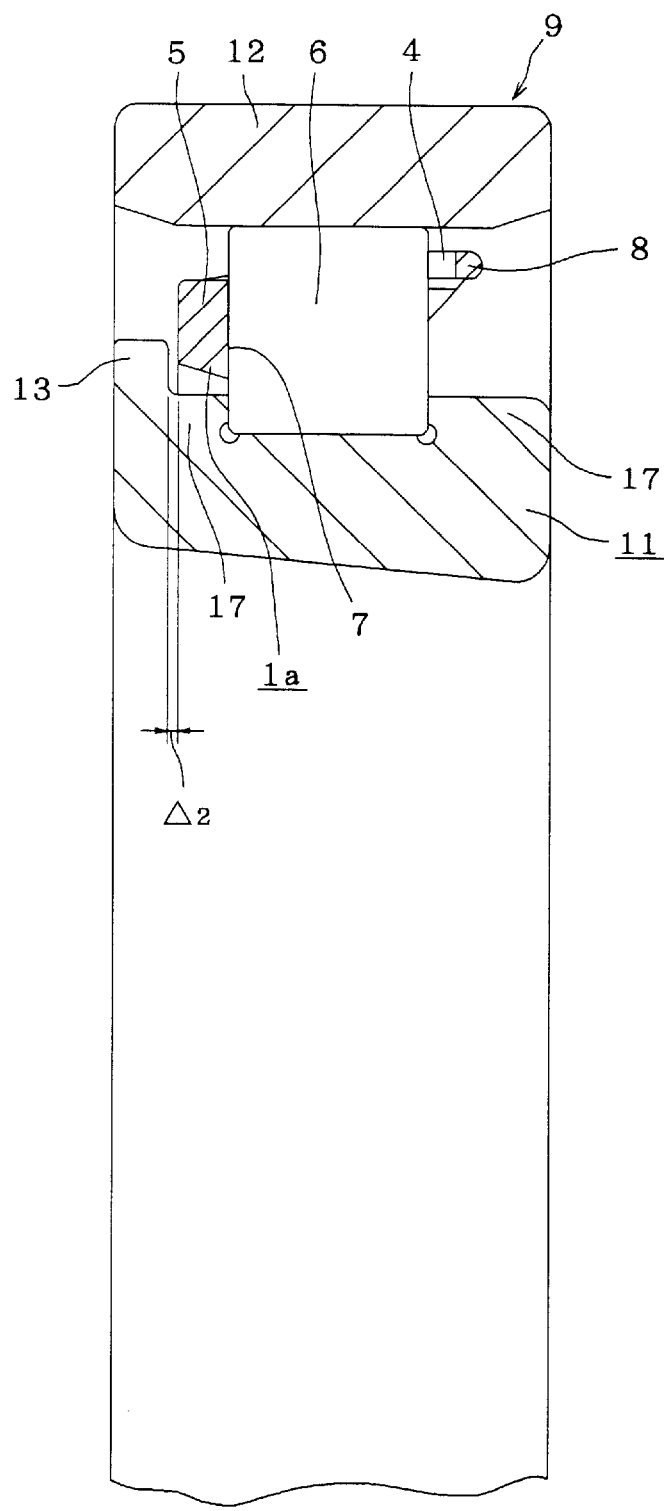
FIG. 3 is a cross sectional view of one half of a single row cylindrical roller bearing with the cage of FIG. 1 incorporated therein.
Figure 4:
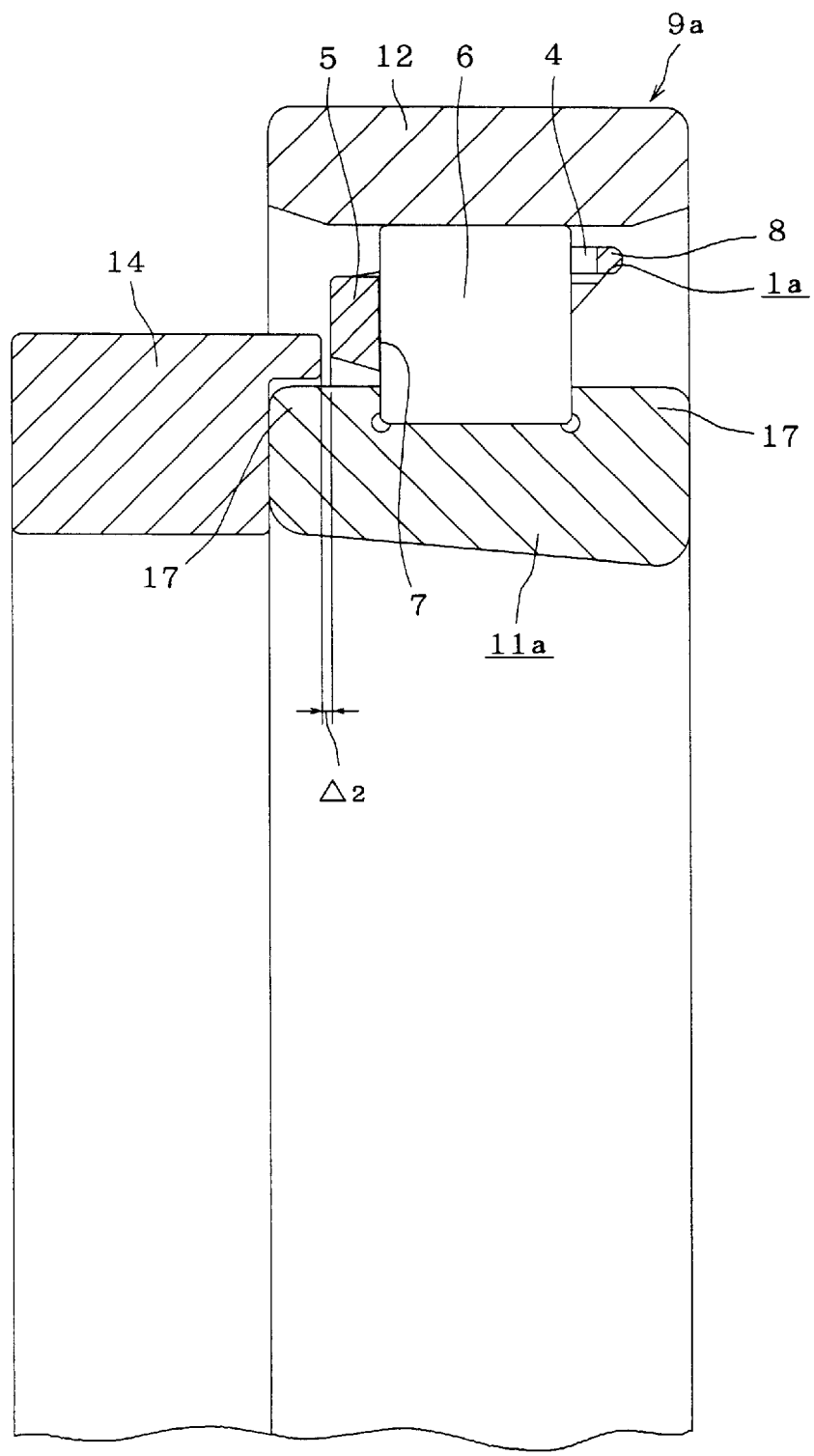
FIG. 4 is a cross sectional view of one half of a single row cylindrical roller bearing with the synthetic resin cage in a second example of the embodiments of the present invention incorporated therein.
Figure 5:
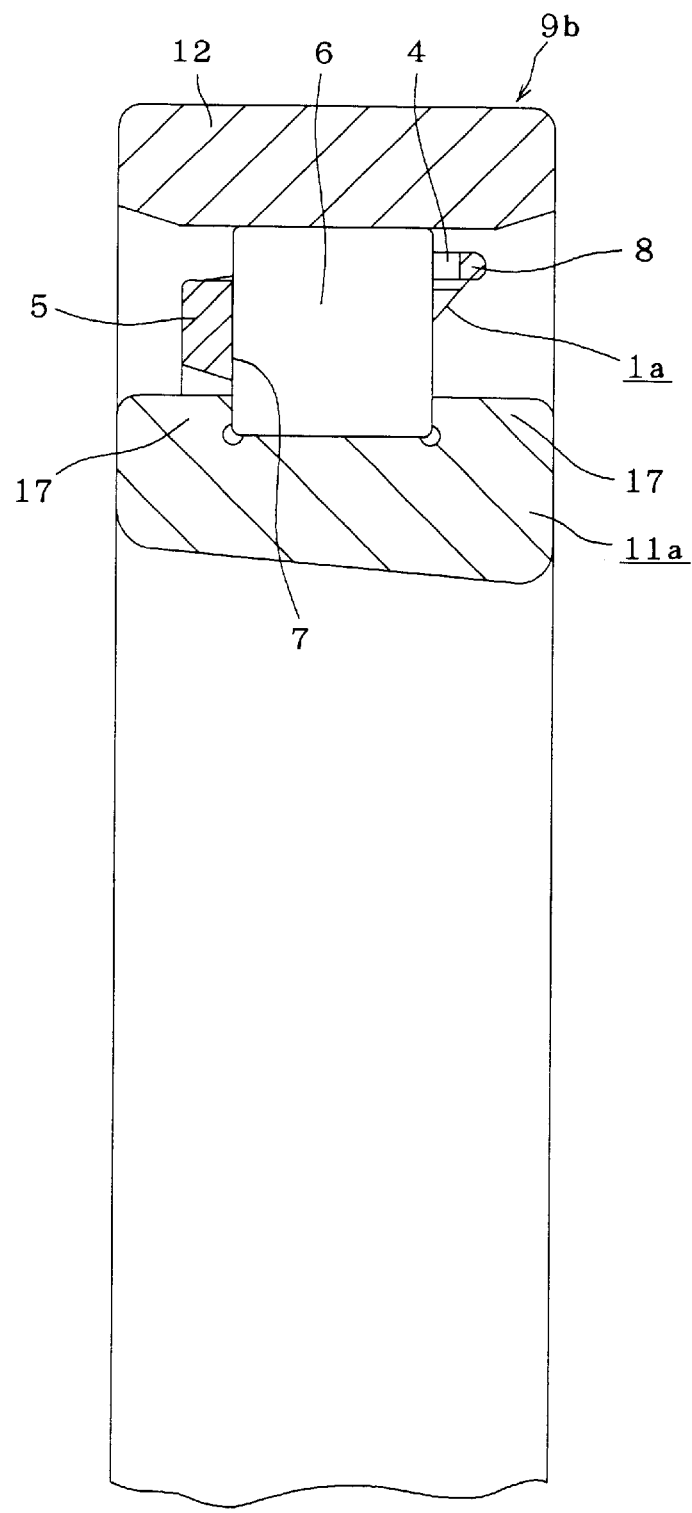
FIG. 5 is cross sectional view of one half of a single row cylindrical roller bearing with the synthetic resin cage in a third example of the embodiments of the present invention incorporated therein.
Figure 6:
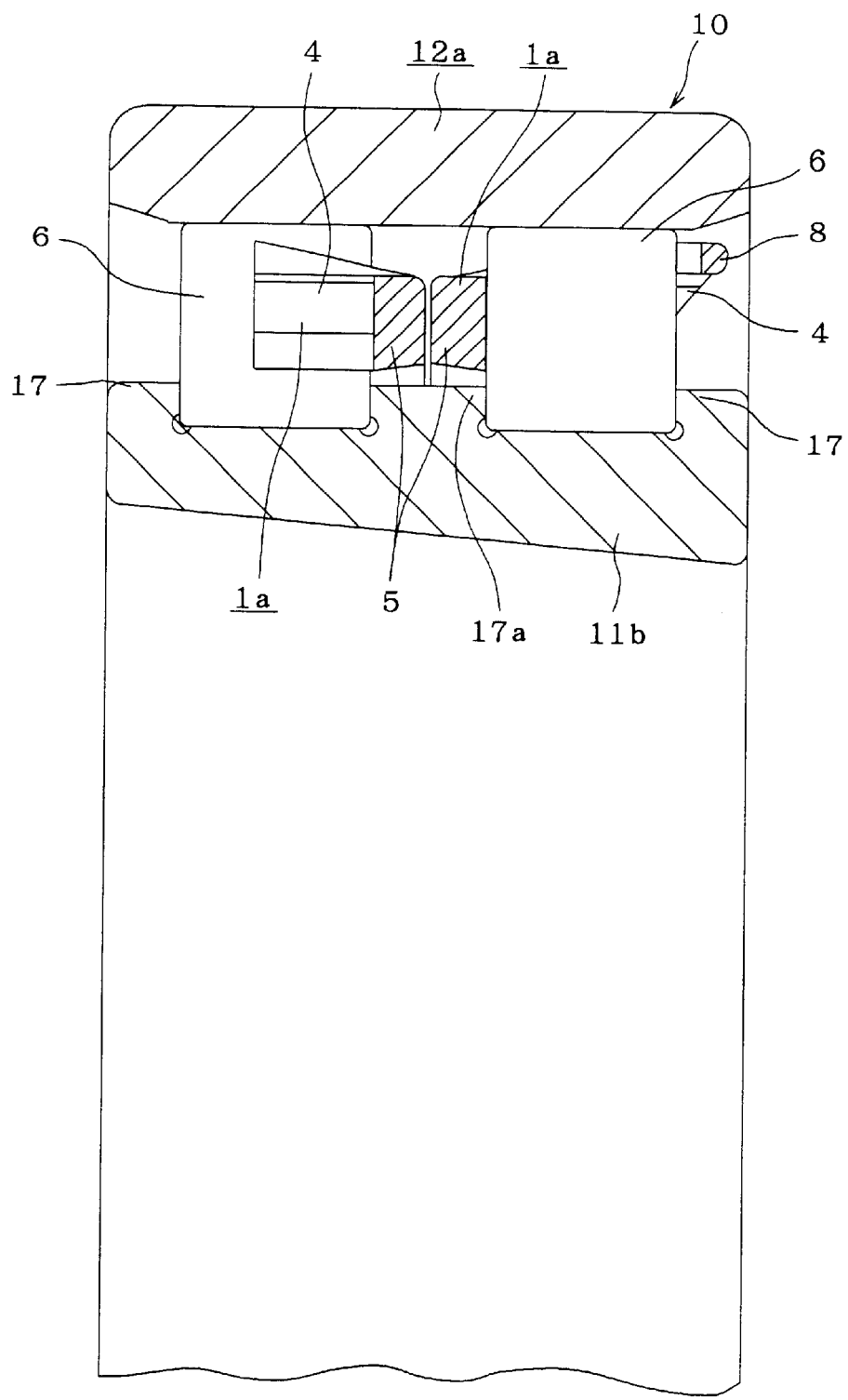
FIG. 6 is a cross sectional view of one half of a double-row cylindrical roller bearing with the cage of FIG. 1 incorporated therein in a pair.

The synthetic resin cage 1a for roller bearing of this embodiment of the invention as described above is assembled in a single-row cylindrical roller bearing 9, 9a, 9b as shown in FIGS. 3 thru 5, or in each row in a double-row cylindrical roller bearing 10 as shown in FIG. 6.

When operating a machine tool or other machining equipment, mounted with a single-row cylindrical roller bearing 9, 9a, 9b or a double-row cylindrical roller bearing 10 in which the synthetic resin cage(s) 1a of this embodiment is assembled, extreme large stresses do not occur inside the synthetic resin cage(s) 1a, for example in the connecting section between the columns 4 and circular ring 5, even if the rollers 6 press strongly against the columns 4.

In other words, for the reason described above, as a result of the revolution speed of the some of the rollers 6 differing from the speed of revolution of the other rollers 6, the columns 4, that are supported on one end in a cantilever way by the circular ring section 5, are displaced in the circumferential direction, even when large stresses occur in the columns 4 that oppose these few rollers 6. Due to this displacement, stresses in the synthetic resin cage 1a are kept from becoming excessively large, and it is possible to prevent these stresses from becoming large enough to cause damage to the synthetic resin cage 1a. As a result, even under varying operating conditions of the single-row cylindrical roller bearing 9, 9a, 9b or double-row cylindrical roller bearing 10, or even when assembly of the bearing is somewhat improper, machining equipment with a rotation support section comprised of single-row cylindrical roller bearings 9, 9a, 9b or double-row cylindrical roller bearing 10, such as the shaft of machine tool, can be operated stably at high speeds for long periods of time. Moreover, even when large stresses act in the circumferential direction on the adjoining columns 4 that are connected to each other at the other end by the connecting frame 8, the aforementioned stresses are absorbed when the connecting frame 8 is elastically deformed, specifically expanding and shrinking in the circumferential direction, making it possible to prevent the stresses from becoming large.

Moreover, the connecting frame 8 that is formed at three locations around in the circumferential direction prevents the synthetic resin cage 1a from displacing in the axial direction with respect to the roller 6 due to the its engagement with the end surface of the roller 6.

Also, even in the case where the synthetic resin cage 1a of this embodiment is incorporated, as shown in FIG. 5, in the single-row cylindrical roller bearing 9b, that does not have a member which faces the circular section 5 of the synthetic resin cage 1a in the axial direction, it is possible to prevent the synthetic resin cage 1a from falling out in the axial direction from between the outer peripheral surface of the inner race 11 and the inner peripheral surface of the outer race 12.

For the synthetic resin cage 1a of this embodiment as shown in FIGS. 3 and 4, for when the cage 1a is incorporated in the single-row cylindrical roller bearings 9, 9a, that have a rim section 13 or spacer 14 which faces the circular ring section 5 of the synthetic resin cage 1a in the axial direction, the dimensions of each part are regulated as follows.

In other words, when one end face of the roller 6 (left end face in FIGS. 3 and 4) is m contact with one side face of the circular ring section 5 (right side face in FIGS. 3 and 4). the width $\Delta_1$ of the clearance that exists between the connecting frame 8 and the other end face of the roller 6 (the space between the circular ring section 5 and the projection of the connecting frame 8, that is the length if the pocket 7 is taken to be $L_7$ and the length of the roller 6 is taken to be $L_6$, then $\Delta_1=L_7-L_6$), is made larger than the width $\Delta_2$ of clearance between the other side face of the circular ring section 5 (left side face in FIGS. 3 and 4) and the rim section 13 (FIG. 3) or the spacer 14 (FIG. 4) ($\Delta_1>\Delta_2$)

By regulating the widths $\Delta_1$ and $A_2$ of these clearances, it is possible to prevent rubbing between the weak connecting frame 8 and the other end of the roller 6, and thus it is possible to maintain the durability of the connecting frame 8.

It is possible to maintain the overall strength of the synthetic resin cage 1a by the circular ring section 5. Accordingly, it is avoided that as the columns 4 are elastically deformed easily in the circumferential direction, the overall strength of the synthetic resin cage 1a is insufficient.

Figure 7:
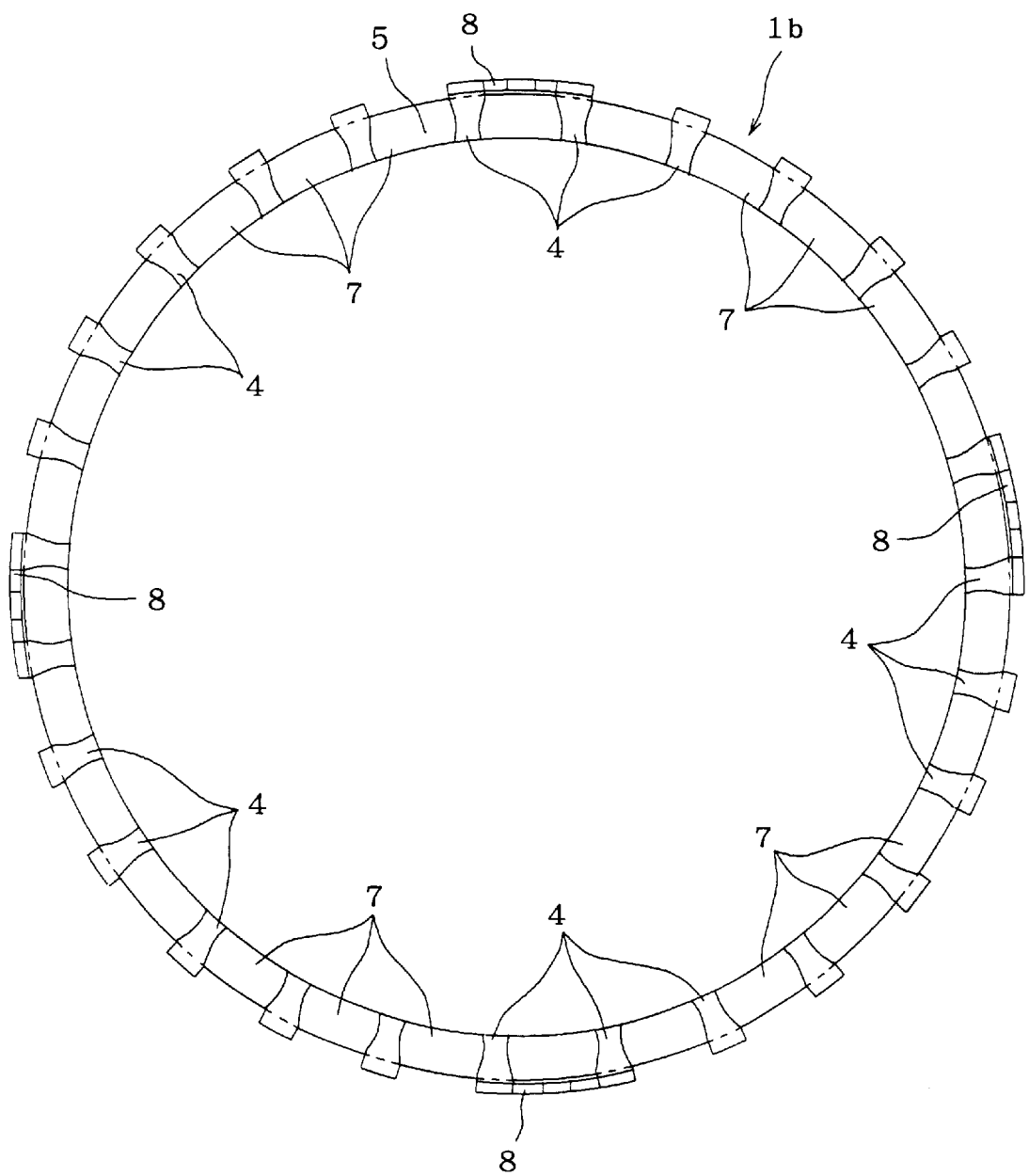
FIG. 7 is an elevational view taken from the side opposite to the circular ring portion of the synthetic resin cage of FIG. 4.

On the other hand, when considering only absorption of the forces in the circumferential direction, for example, it is possible to absorb the forces in the circumferential direction even when both ends of the multiple columns 4, that are spaced around in the circumferential direction, are connected alternately in the circumferential direction. With this kind of construction, the support rigidity of the columns 4 in the radial direction of the synthetic resin cage 1a is reduced, and when the synthetic resin cage 1a is rotated at high speed, the columns 4 displace outward relatively easily in the radial direction of the synthetic resin cage 1a, and operation of rotating equipment with single-row cylindrical bearings 9, 9a, 9b, or double-row cylindrical bearing 10 becomes unstable. In the construction of this embodiment, one end of the columns 4 connects with the circular ring section 5 that is continuous in the circumferential direction, so t his problem does not occur, Next, FIG. 7 shows a second embodiment of the invention which also corresponds to the first feature. In the case of the synthetic resin cage 1b of this embodiment, twenty eight (28) columns 4 are evenly spaced around in the circumferential direction and supported using a cantilever method by one circular ring section 5 that is located on one end (far end in FIG. 7) in the axial direction. Also, four pairs or eight columns 4 are connected to each other at the other end thereof (front end in FIG. 7) by a connecting frame 8 that prevents the rollers from falling out.

The structure is the same as that of embodiment 1 except that by making the number of columns twenty eight (28), or a multiple of four, the connecting tubes 8 are located at four locations in the circumferential direction.

It is desirable that the connecting frames 8 be evenly spaced around in the circumferential direction in order to maintain the rotating balance of the synthetic resin cage. However, if the speed of rotation is low during operation and it is not necessary to maintain such a high level of rotating balance, or if weight of the frames 8 is varied somewhat in order to maintain balance, it is not necessary that the connecting frames 8 be evenly spaced in the circumferential direction.

Figure 8:
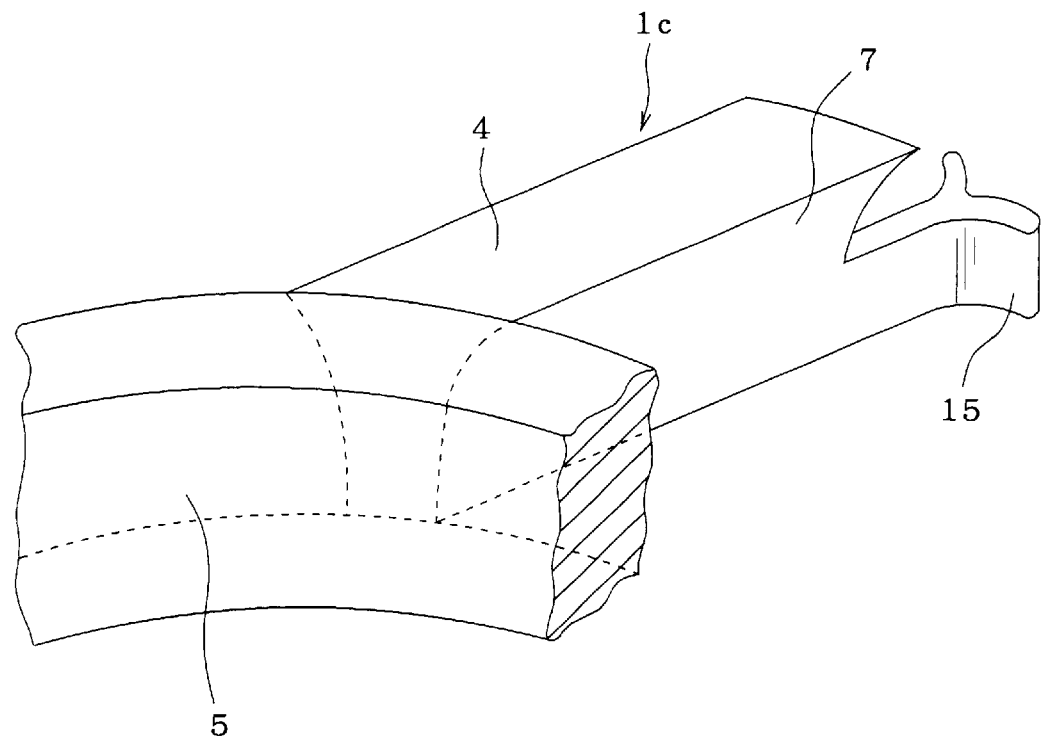
FIG. 8 is an enlarged perspective view of a portion of the cage of FIG. 5.

Next, FIG. 8 shows a third embodiment of this invention which also corresponds to the first feature. In the synthetic resin cage 1c of this embodiment, the multiple columns 4 are supported using a cantilever method by the circular ring section 5 which is continuous with the ends of the columns 4, and a protruding piece or retaining piece 15 that prevent rollers from falling out is formed on the other end of at least some of these columns 4. This protruding piece 15 faces the end face of the roller that is held in the pocket 7 and prevents the synthetic resin cage 1c from displacing in the axial direction with respect to the roller. Also, even if the synthetic resin cage 1c of this embodiment is assembled in the single-row roller bearing 9b as shown in FIG. 5, this synthetic resin cage 1c is prevented from falling out in the axial direction from between the outer peripheral surface of the inner race 11 and inner peripheral surface of the outer race 12.

The other construction and function of this embodiment is substantially the same as that of the first embodiment.

Figure 9:
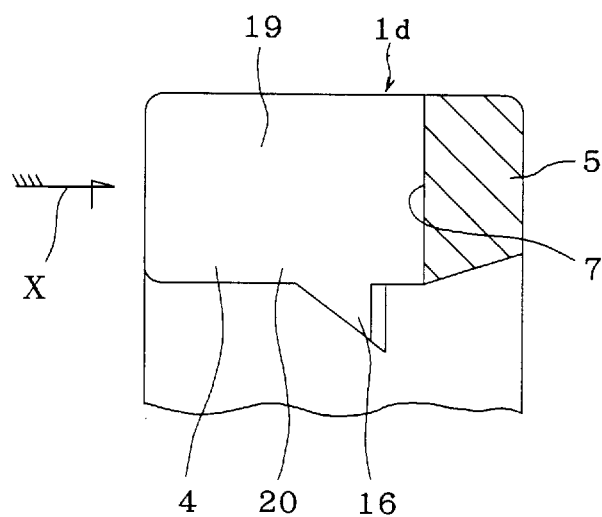
FIG. 9 is a cross sectional view of a portion of the synthetic resin cage in a fourth example of the embodiments of the present invention.
Figure 10:
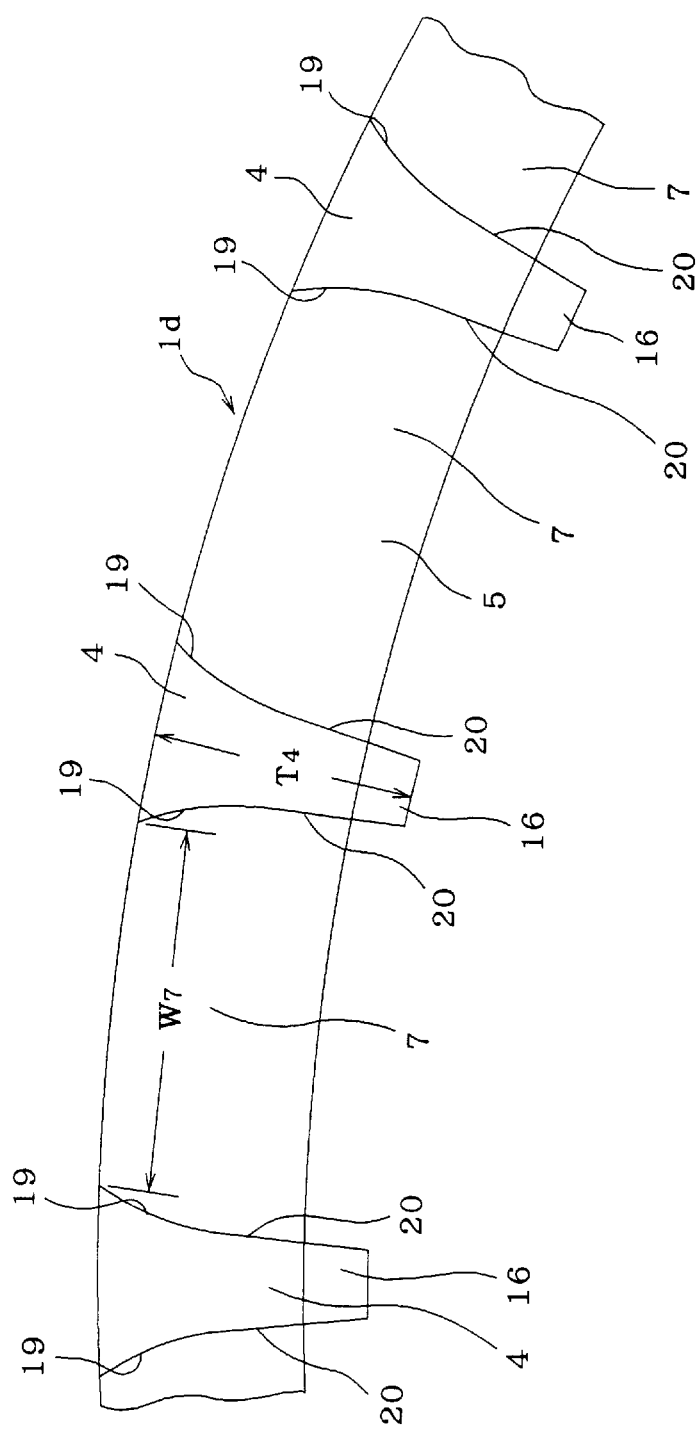
FIG. 10 is a view taken from the direction of arrow X in FIG. 9.

Next, FIGS. 9 and 10 show a fourth embodiment of this invention that corresponds to the second features. The synthetic resin cage 1d of this embodiment also has multiple columns 4 that are evenly spaced around in the circumferential direction and that are connected and supported on one end in the axial direction by a circular ring section 5 using a cantilever method. Also, the sections that are surrounded on three sides by the opposite sides in the circumferential direction of the adjacent columns 4 and one side face of the circular ring section 5 form pockets 7 in which rollers 6 (see FIG. 11) are rotatably held.

Figure 11:
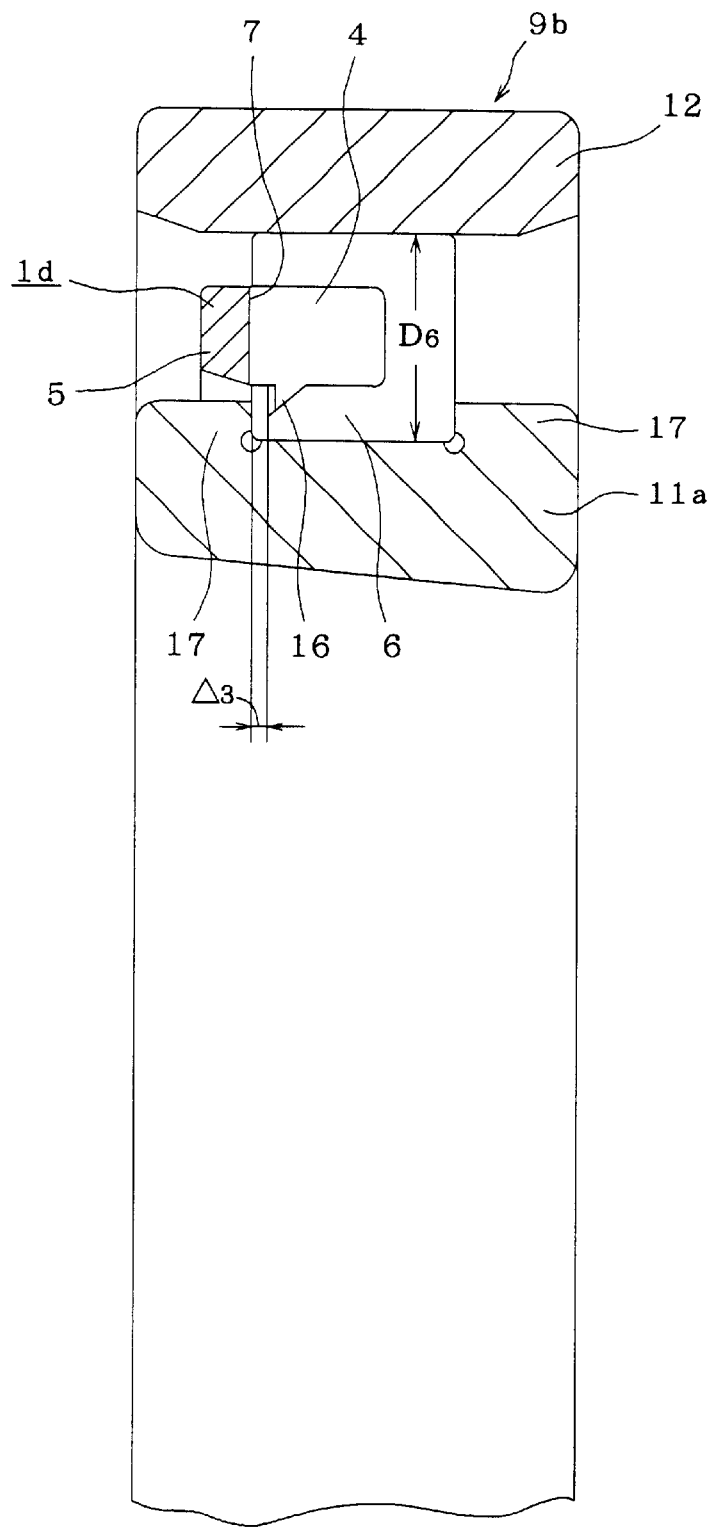
FIG. 11 is a cross sectional view of one half of a single row cylindrical roller bearing with the cage of FIG. 9 incorporated therein.
Figure 12:
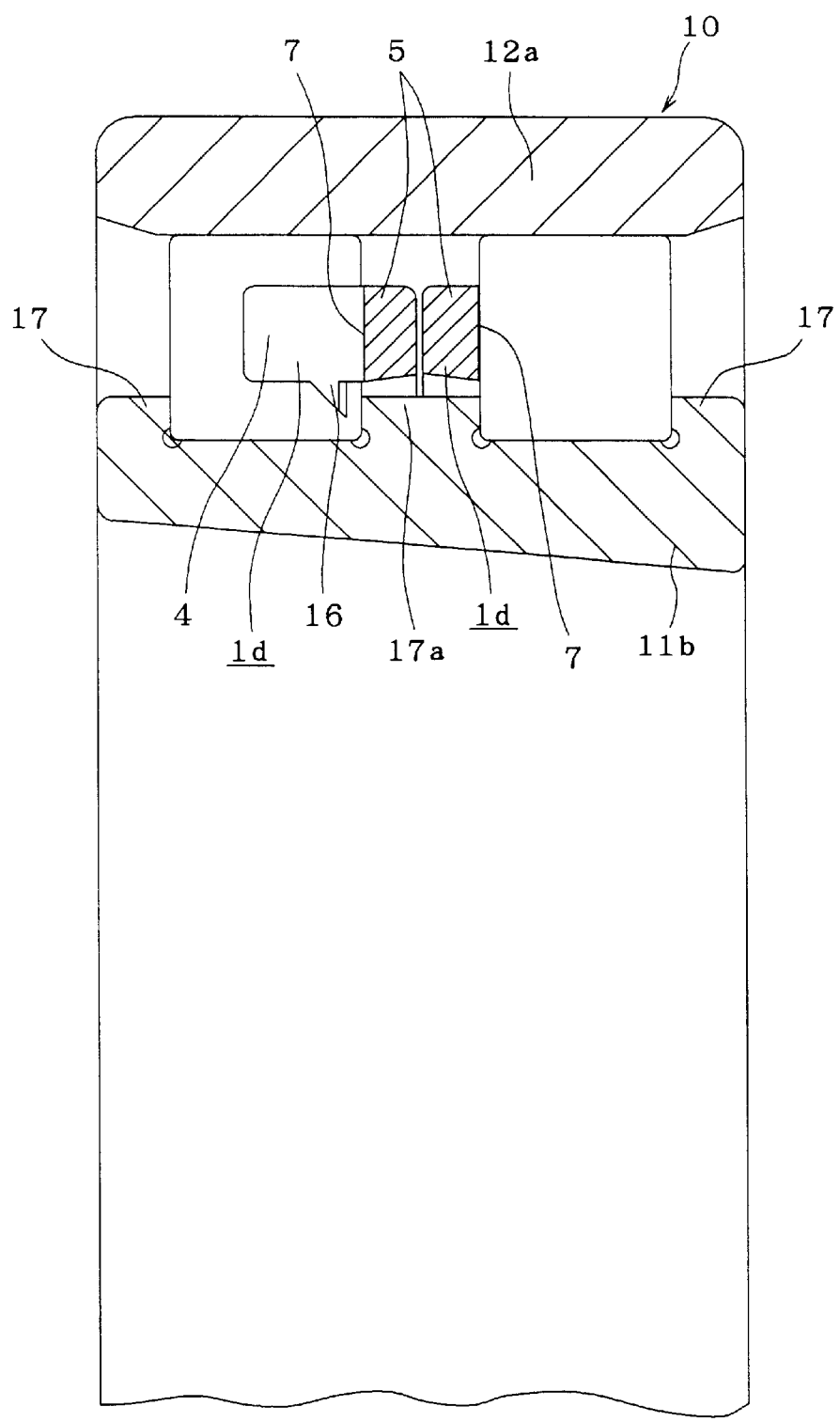
FIG. 12 is a cross sectional view of one half of a double-row cylindrical roller bearing with the cage of FIG. 9 incorporated therein in a pair.
Figure 13:
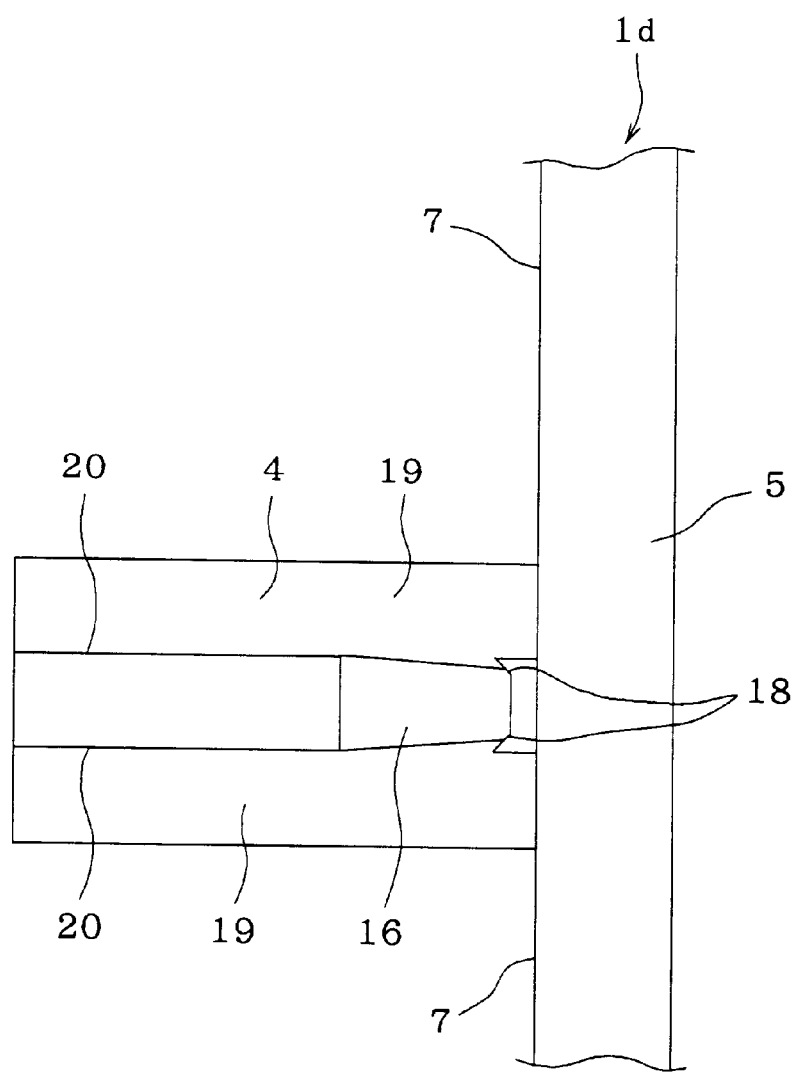
FIG. 13 is a view taken from the lower side of the left cage of FIG. 12 to show a desirable shape of the engagement protrusion.
Figure 14:
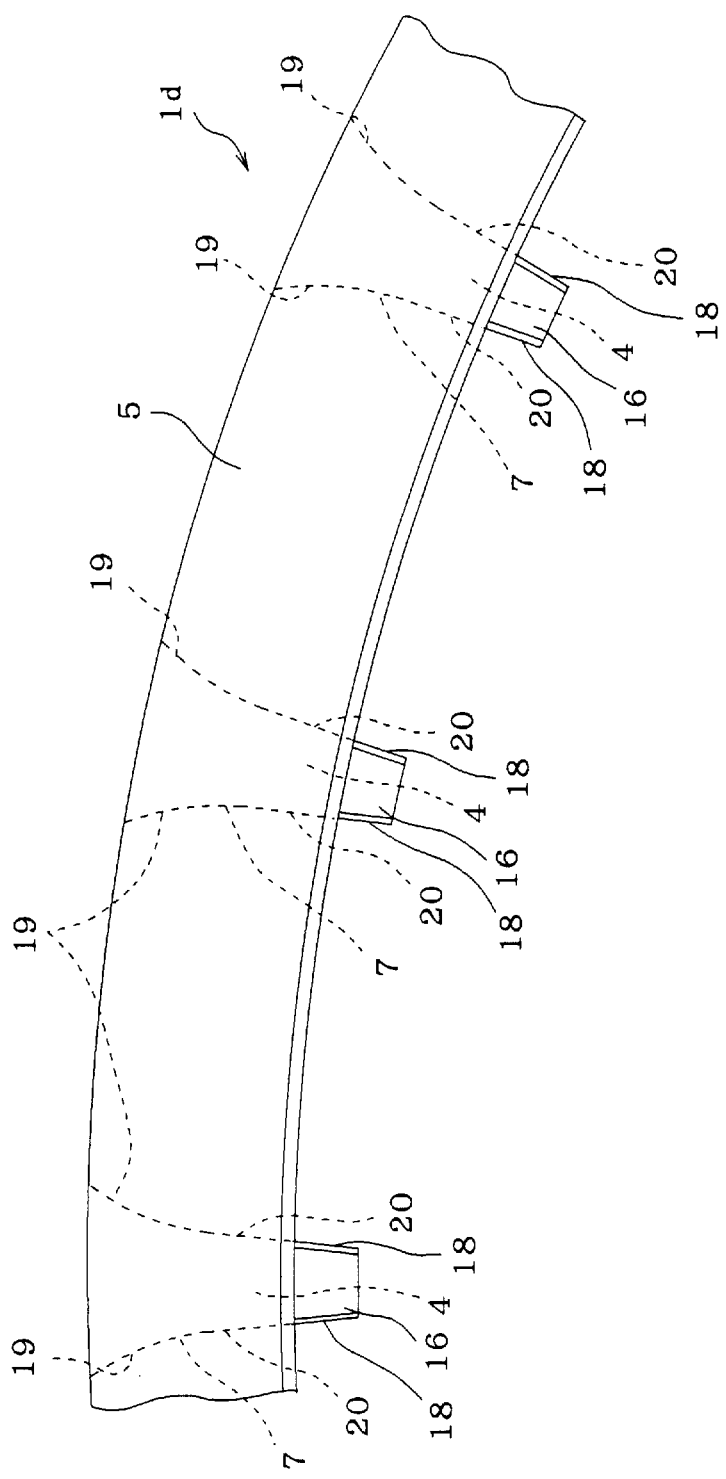
FIG. 14 is a view taken from the right side of the left cage of FIG. 12 to show a desirable shape of the engagement protrusion.
Figure 15:
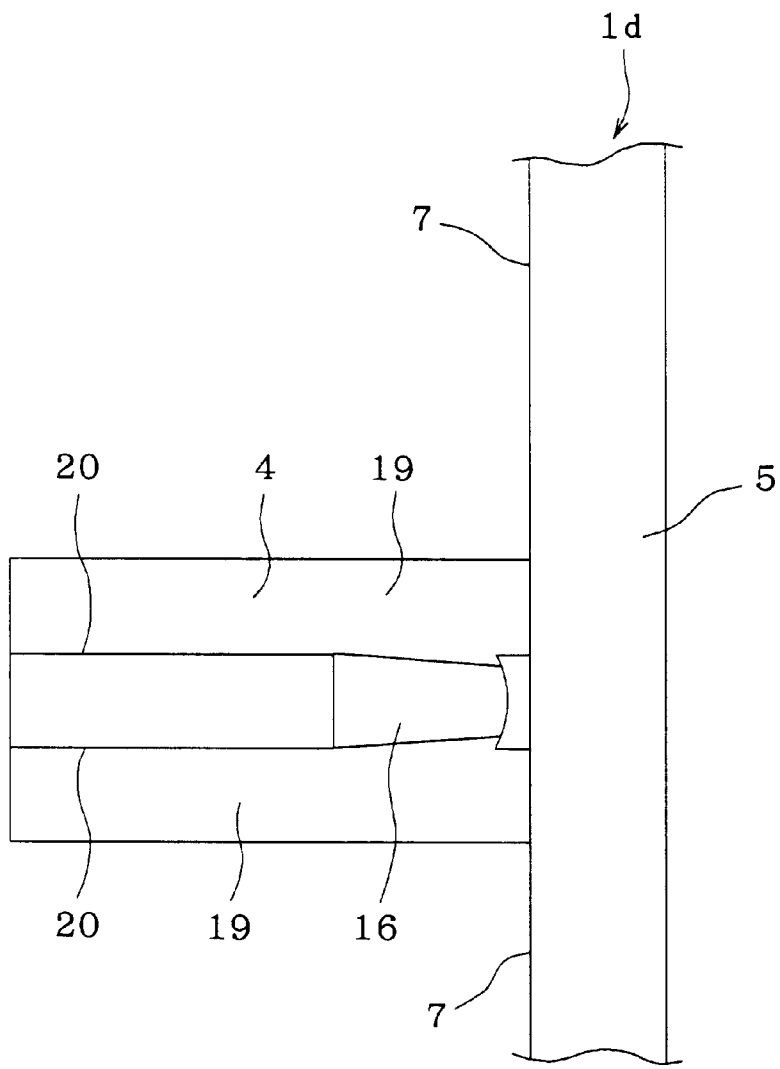
FIG. 15 is a view taken from the lower side of the left cage of FIG. 12 to show another desirable shape of the engagement protrusion.
Figure 16:
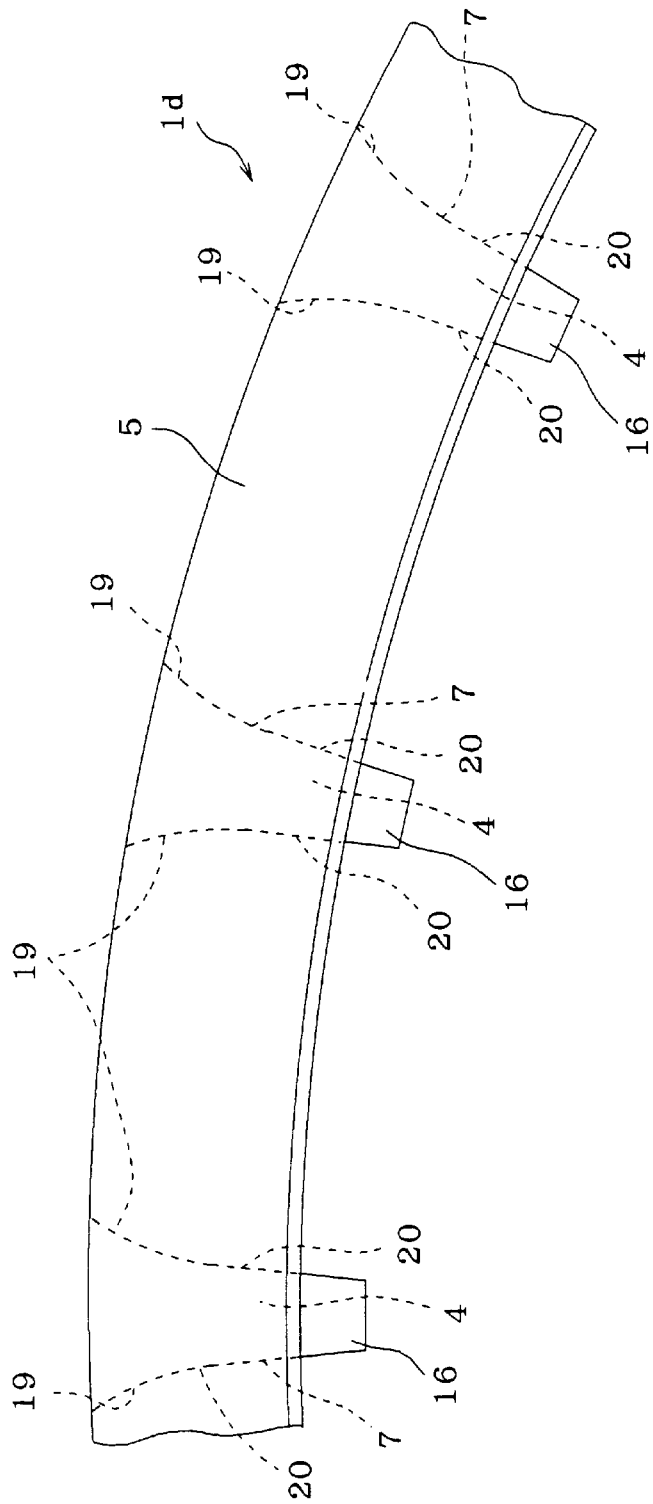
FIG. 16 is a view taken from the right side of the left cage of FIG. 12 to show another desirable shape of the engagement protrusion.
Figure 17:
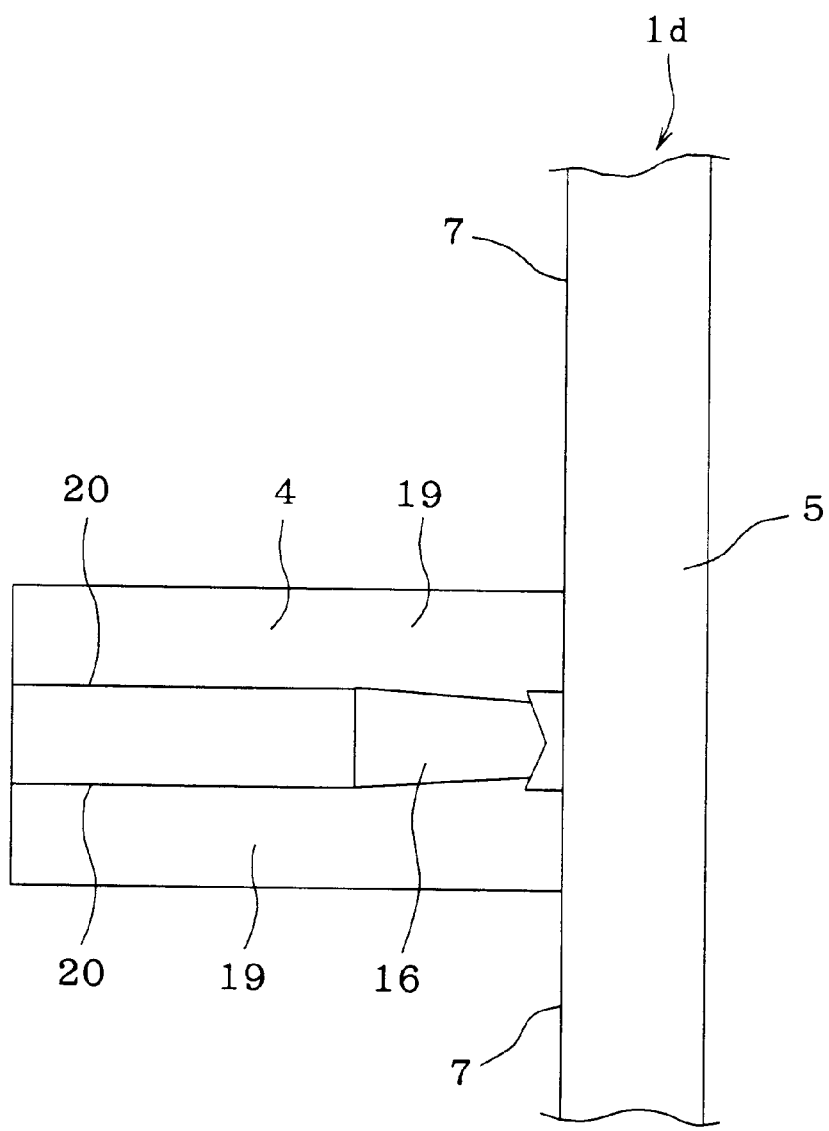
FIG. 17 is a view taken from the lower side of the left cage of FIG. 12 to show another desirable shape of the engagement protrusion.
Figure 18:
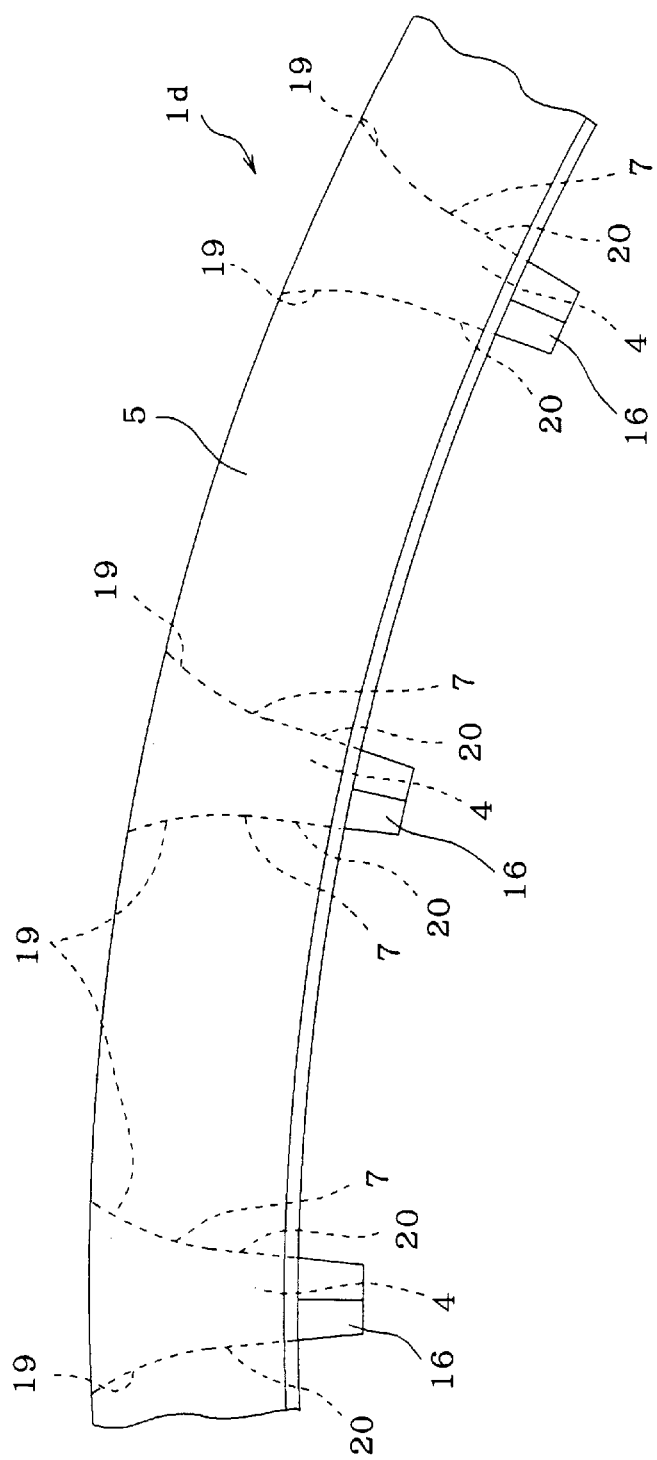
FIG. 18 is a view taken from the right side of the left cage of FIG. 12 to show another desirable shape of the engagement protrusion.

Particularly in the case of the synthetic resin cage 1d for roller bearing of this embodiment, there are triangular shaped engagement protrusions 16 on the inner peripheral surface of at least some of the columns 4. In the case of a single-row cylindrical roller bearing as shown in FIG. 11, or a double-row cylindrical roller as shown in FIG. 12 in which this synthetic resin cage 1d is assembled, these engagement protrusions 16 come in contact with the inner side surface of the rim sections 17, 17a that are formed around the outer peripheral surface of the inner races 11 a, 11b to prevent the synthetic resin cage 1d from falling out from between the outer peripheral surface of the inner races 11a, 11b and the inner peripheral surface of the outer races 12, 12a. Therefore, when the synthetic resin cage 1d is in its free state, the diameter of the inscribed circle made by these engagement protrusions 16 is a little smaller than the outer diameter of the rim sections 17, 17a.

With this embodiment, it is desirable if those surfaces of the protrusions 16 facing the rim sections 17, 17a formed around the outer peripheral surface of the inner races 11a, 11b are shaped such that they do not excessively scrape away the grease on the sides of these rim sections 17, 17a. FIGS. 13 thru 18 show three examples of shapes that prevent the grease being scraped away excessively. In the case of the first example, shown in FIGS. 13 and 14, the surface portion of the engagement protrusions 16 that face the rim sections 17, 17a is chamfered on both sides in the circumferential direction, In the case of the second example shown in FIGS. 15 and 16, the surface portion of the engagement protrusions 16 that faces the rim sections 17, 17a is formed generally in a partial cylindrical convex shape. Finally, in the third example, shown in FIGS. 17 and 18, the surface portion of the engagement protrusions 16 that faces the rim section 17, 17a is formed generally in a convex shape that is angle-shaped in the center.

In the fourth embodiment of the invention, shown in FIGS. 9 and 10, both side surfaces in the circumferential direction of the columns 4 are formed with a curved section 19 on the outside in the radial direction of the synthetic resin cage 1d and a flat section 20 on the inside in the radial direction, such that these sections are connected smoothly. Of these, the radius of curvature of the curved section 19 is a little larger (about 0.5 to 10%) than the radius of curvature of the rolling surface of the roller 6 held in the pocket 7. Also, the pair of flat sections 20 are parallel with each other, and make up the portions on the inner diameter side from the center in the radial direction of the inner surfaces opposed in the circumferential direction in the same pocket 7.

Moreover, the pair of curved sections 19, that make up the portions on the outer diameter side of the inner side surfaces opposed in the circumferential direction of the same pocket 7, are such that the space between the pair of curved sections 19 becomes narrower toward the opening on the outer diameter side of the pocket 7.

By making the shape of the opposed side surfaces in the circumferential direction of the columns 4 as described above, there is no severe friction between either of the side surfaces in the circumferential direction of the columns 4 and the rolling surface of the rollers, even when the columns 4, supported using a cantilever method on one side of the circular ring section 5, are displaced outward in the radial direction of the synthetic resin cage 1d due to the centrifugal force that acts on them during operation. In other words, the space between the pair of flat sections 20 that make up the inner diameter section of the opposed inside surfaces in the circumferential direction of the columns 4 does not become narrower even though the columns 4 displace outward in the radial direction. On the other hand, if the opposed side surfaces in the circumferential direction of the columns 4 are made cylindrical by curving them toward the inside diameter side, and if the dimension of the pockets in the circumferential direction. become more narrow in the radial direction at the opening on the inner diameter side than at the center, then when the columns 4 are displaced outward in the radial direction of the synthetic resin cage 1d due to the centrifugal force that acts on them during operation, there is a possibility that severe friction between the opposed side surfaces in the circumferential direction of the columns 4 and the rolling surface of the roller 6 could occur, so this is not desirable.

Moreover, it is best if the width $W_7$ of the pocket 7 in the circumferential direction at the opening on the outer diameter side is held to the range of 0.7 to 0.9 times the diameter $D_6$ (see. FIG. 11) of the roller 6 held inside the pocket ($W_7$=(0.7 to 0.9) $D_6$). If this width $W_7$ is larger than this range ($W_7$>0.9 $D_6$), then when the space between pairs of adjacent columns 4 is opened due to centrifugal force, the roller 6 is pinched inside the opening on the outer diameter side of the pocket 7, thus bringing about the possibility of obstructing the rotation of the roller 6. Conversely, in order to make this width $W_7$ more narrow than this range ($W_7$<0.7 $D_6$), it is necessary to increase the thickness $T_4$ of the columns 4 in the radial direction of the synthetic resin cage 1d. As a result, problems occurs such as, it becomes easier for interference to occur between the inner peripheral surface of the outer races 12, 12a of the roller bearing and the synthetic resin cage 1d, or the grease on the inner peripheral surface of the outer races 12, 12a could be scraped away by the outer peripheral edge of the columns 4, causing poor lubrication between the outer raceway and the rolling surface of the roller 6.

Figure 19:
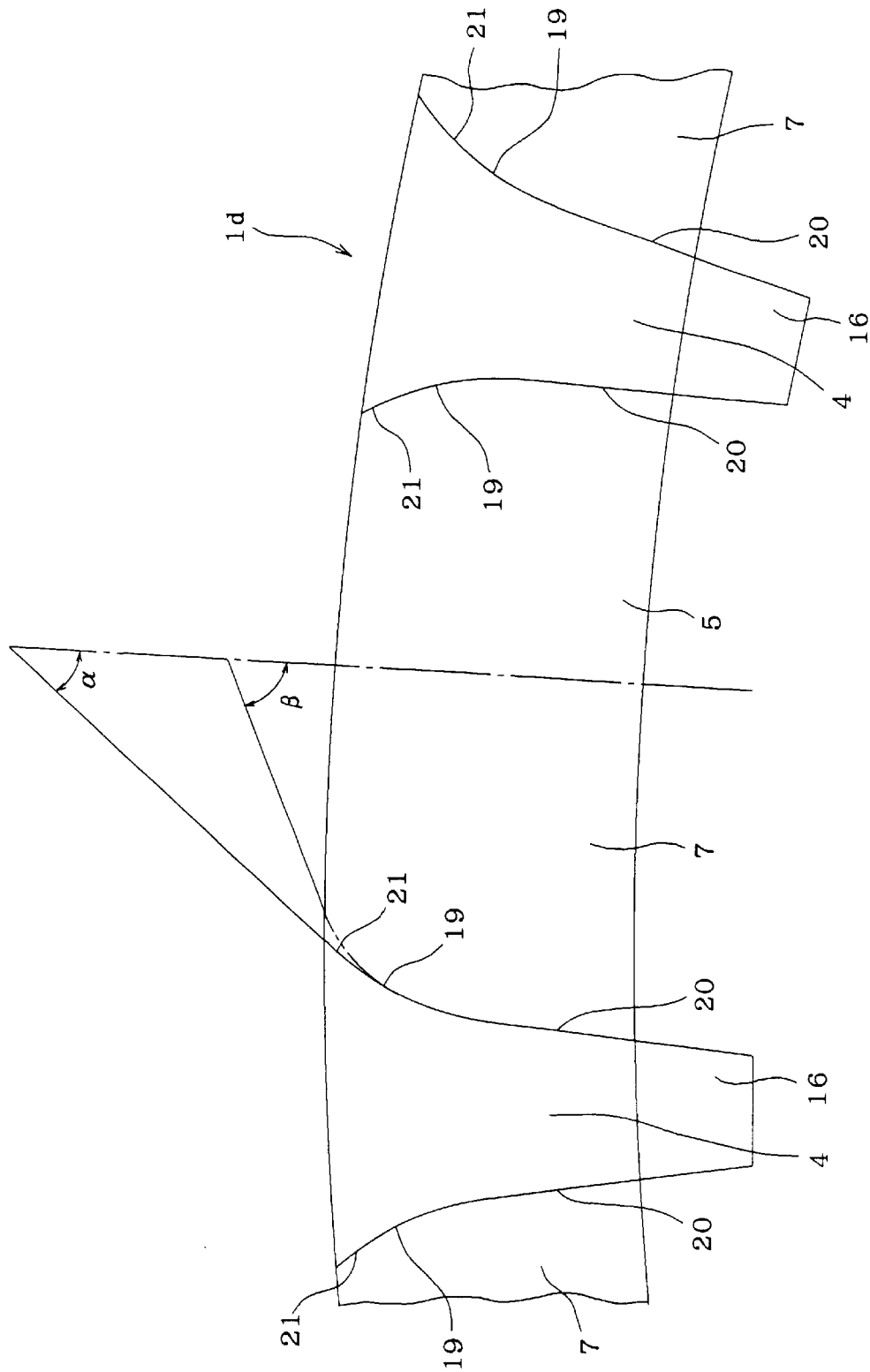
FIG. 19 is a view similar to FIG. 10 to show a desirable shape of the radially outer opening portion of a pocket.

Furthermore, by using chamfered edges 21 as shown in FIG. 19 at the opening on the outer diameter side of the pocket 7, the grease on the rolling surface of the roller 6 is not excessively scraped away at the opening on the outer diameter side, which is desirable. In order for this, the α of the chamfered edges 21 with respect to the radial direction of the synthetic resin cage 1d is larger than 0-degrees and smaller than the angle β of the opening on the outer diameter side. Also, it is best if the chamfering angle α is smaller than the opening angle β by 10-degrees or more ($\alpha \leq \beta - 10$ degrees). The angle of the opening β is the angle of intersection between a tangent line with respect to the curved sections 19 at the opening on the outer diameter side of the pocket 7, provided that the curved section 19 were extended as are without changing the radius of curvature, and a straight line that passes through the center of the pocket 7 and through the center of the synthetic resin cage 1d.

Moreover, if a synthetic resin cage 1d that meets the conditions described above were to be assembled in the single-row cylindrical roller bearing 9b, as shown in FIG. 11, or in the double-row cylindrical roller bearing 10, as shown in FIG. 12, an appropriate clearance $\Delta_3$ is provided between the engagement protrusions 16 and the rim sections 17, 17a (See FIG. 11. For example $\Delta_3$ about 0.1 mm to about 2 mm). By providing this adequate space $\Delta_3$, it is possible to maintain smooth operation, even if the cylindrical roller bearing is subjected to large vibration during operation, or if the synthetic resin cage 1d is vibrated Next, the desired shape and dimensions of this invention will be explained. First, the length of the columns 4 will be explained.

Through testing and analysis, the inventors have learned the proper range for the length of the columns 4 that are formed on the elastically deformable synthetic resin cage 1d using a cantilever method.

Figure 20:
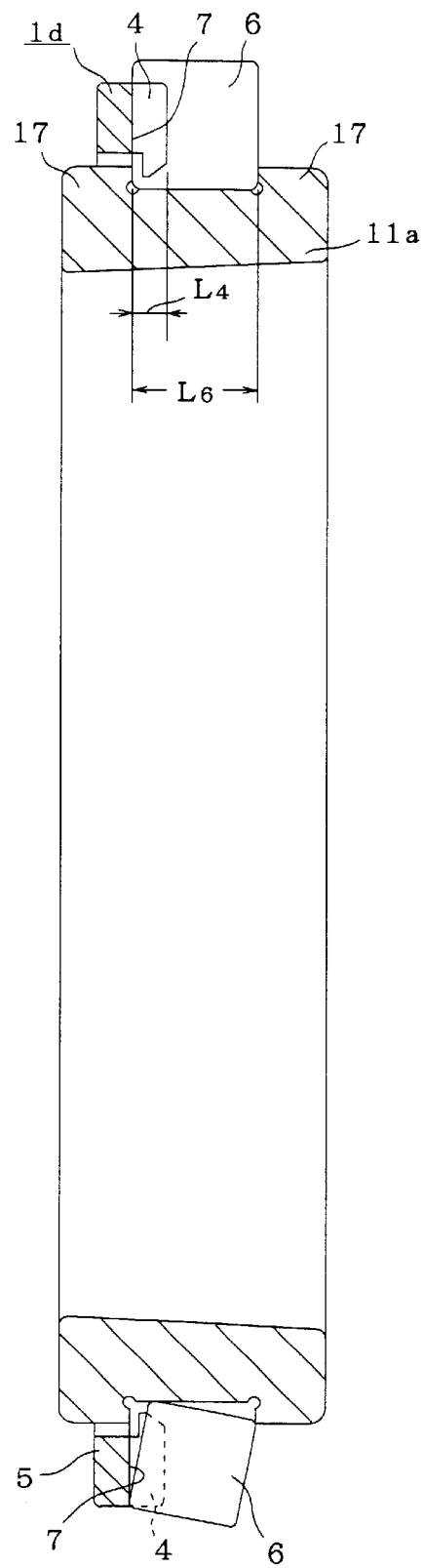
FIG. 20 is a cross sectional view of a cylindrical roller bearing in an assembly step using a synthetic resin cage with shorter columns.

First, FIG. 20 shows the case of a short column 4. Also, in FIG. 20 it shows the assembly stage of construction in which as ill the case of the single-row cylindrical roller bearing 9b, shown in FIG. 11, or the double-row cylindrical roller bearing 10, shown in FIG. 12, the outer races 12, 12a do not have a rim section but only the inner races 11, 11a have rim sections 17. In this stage, the multiple rollers 6 are held as if hooked at the tip end of the columns 4 of the synthetic resin cage 1d on the outer peripheral surface of the inner race 11. Therefore, if the lengths of the columns 4 are short, then the rollers 6 easily fall out of the pockets 7 that exist between adjacent columns 4 in the circumferential direction.

Figure 21:
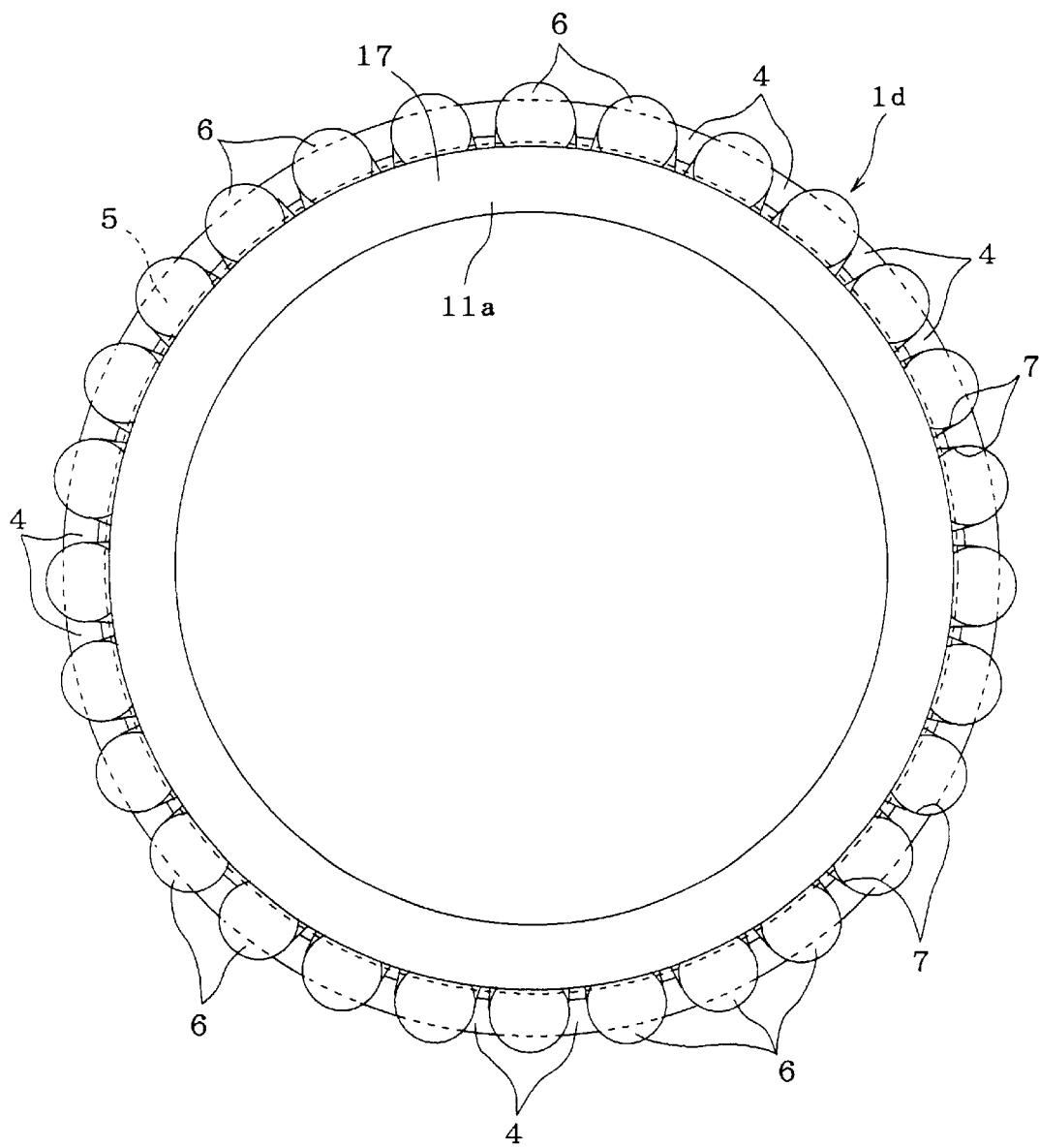
FIG. 21 is a view taken from the right side of FIG. 20.

Particularly, the rigidity of the synthetic resin. cage 1 is low compared with that of a cage made of metal such as a copper alloy, so, if the center axis of the synthetic resin cage is placed in the horizontal direction such that it is the horizontal axis, as shown in FIGS. 20 and 21, the columns 4 is subject to deflection due to the weight of the rollers 6 that are held in the pockets 7, and if they are deflected, it becomes even easier for the roller 6 to come out of the pockets 7.

According to the test and analyses performed by the inventors, it was found that when the synthetic resin cage 1d is used for a cylindrical roller bearing of the size to be assembled in the rotation support for the shaft of machine tools, if the length $L_4$ of the columns 4 was 50% or less that of the length $L_6$ in the axial direction of the rollers 6 ($L_4 \leq 0.5 L_6$), it becomes easy for the rollers 6 that are assembled in the cylindrical roller bearing to come out of the synthetic resin cage 1d.

On the other hand, the upper limit value of the length $L_4$ of the columns 4 must be regulated from the stand point of maintaining stable rotation of the cylindrical rollers and not from the standpoint of preventing the rollers 6 from coming out.

Figure 22:
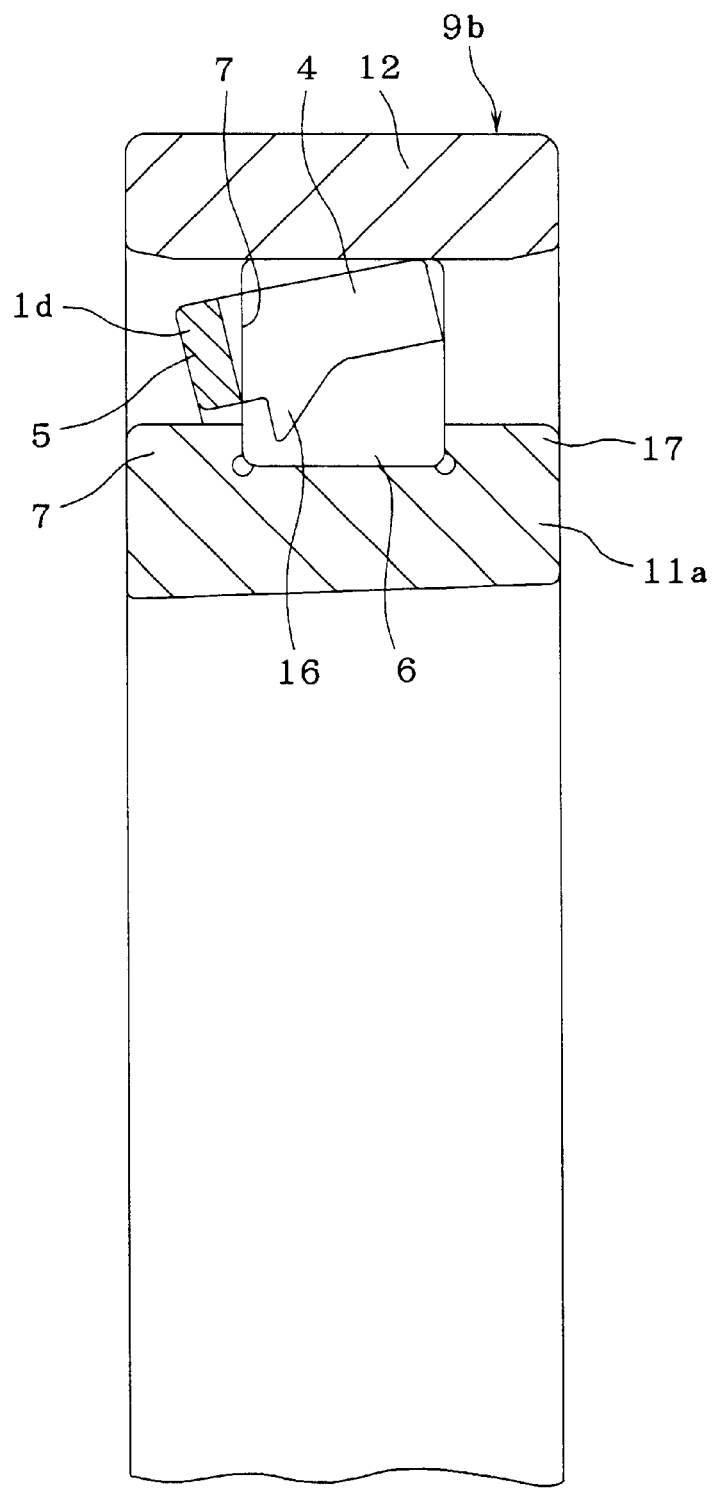
FIG. 22 is a cross sectional view of one half of a cylindrical roller bearing using a synthetic resin cage with shorter columns to show the state of the columns elastically deformed during high speed operation.

In FIG. 22, the case where the length $L_4$ of the columns 4 is long is shown. As shown in FIG. 22, as the column 4 becomes longer, not only does the weight of the column 4 increase, but the center of gravity of the column 4 also becomes further separated from the circular ring section 5 which supports it. Therefore, as the synthetic resin cage 1d turns in revolution, the centrifugal force acting on the column 4 becomes larger, and the amount of deformation of the column 4 due to the centrifugal force that occurs during high-speed rotation increases with the increased length $L_4$, as in a curve of the second order. As a result, if a cylindrical roller bearing, assembled with a synthetic resin cage ld whose length $L_4$ of the columns 4 is long, is operated at high speed, the column 4 displaces in the radial direction of the synthetic resin cage 1d and the outer peripheral edge on the tip end of the column interferes with the inner peripheral surface of the outer race 12. When this interference occurs, not only does rotational resistance and large instability occur in the cylindrical roller bearing, but also since the heat generated during operation increases, this situation is undesirable.

Therefore, from the stand point of maintaining stable operation of the cylindrical roller bearing, it is best if the length $L_4$ of the columns 4 is short.

Taking into consideration the above, in order to prevent the rollers 6 from coming out as well as prevent interference between the outer peripheral edge on the tip end of the columns 4 and the inner peripheral surface of the outer race 12 during high-speed operation, it is best if the length $L_4$ of these columns 4 is greater than 50% and equal to or less than 100% the length $L_6$ of the rollers 6 (0.5 $L_6 < L_4 < L_6$), and the best is if it is between 60 and 80% the length $L_6$ in the axial direction ($L_4 = (0.6$ to $0.8) L_6$).

Figure 24:
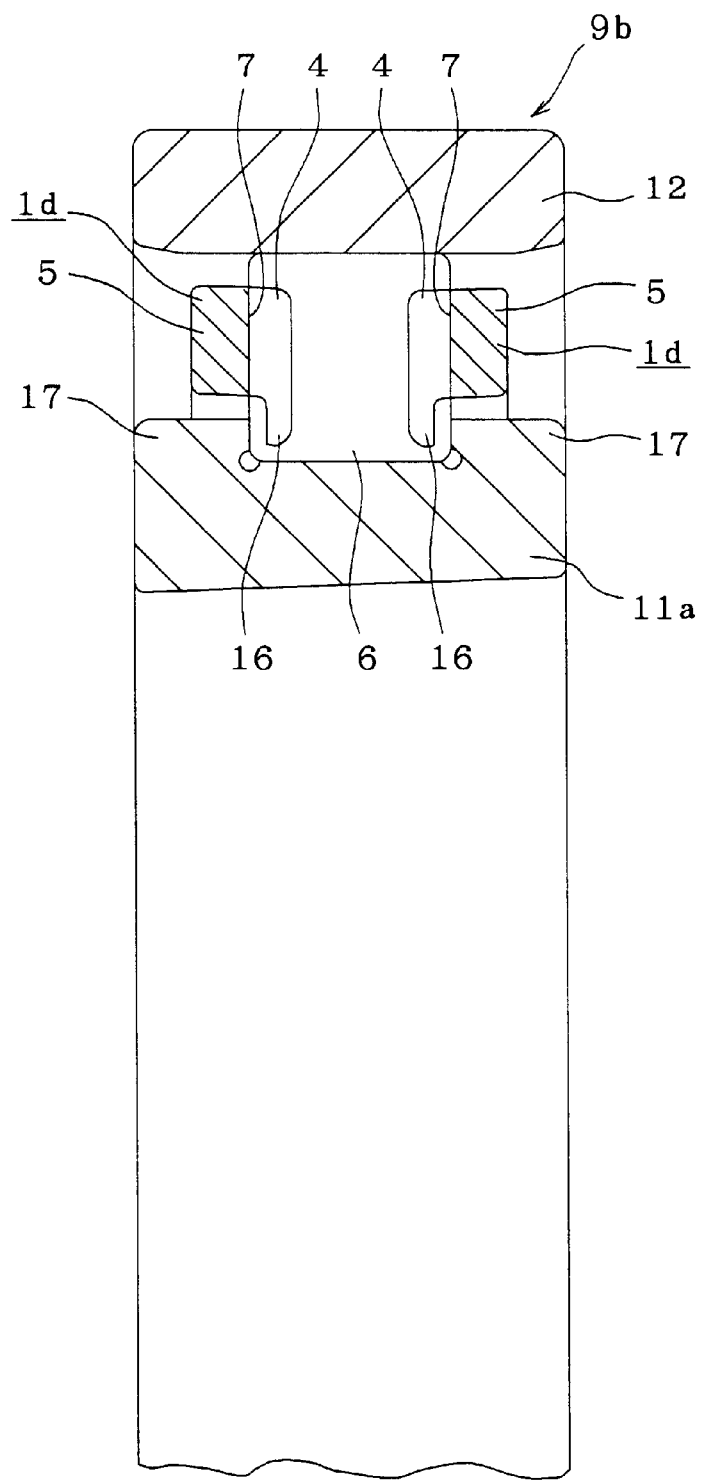
FIG. 24 is a cross sectional view of one half of a cylindrical roller bearing using two synthetic resin cages with shorter columns.

As shown in FIG. 24, two synthetic resin cages 1d are used, one for each row of rollers 6, and by taking the amount of movement in the axial direction of these synthetic resin cages 1d into consideration, the length of the columns 4 of these synthetic resin cages 1d are made as shorter as possible so long as the rollers 6 do not come out of the synthetic resin cages 1d. If this kind of construction is used, the length of the columns 4 of the synthetic resin cages 1d are made to be less than 50% that of the length in the axial direction of the rollers 6, and preferably up to 30%. By using two synthetic resin cages 1d in this way, it is possible to prevent the rollers 6 from coming lout of the synthetic resin cages 1d, as well as keep deformation in the radial direction of the columns 4 to a minimum, thus making high-speed use possible.

Moreover, in the synthetic resin cage for roller bearing of this invention, the base end of the columns 4 are connected to the circular ring section 5, and the tip ends of the columns 4 are separated from each other, so that the lubrication condition is improved.

Figure 31:
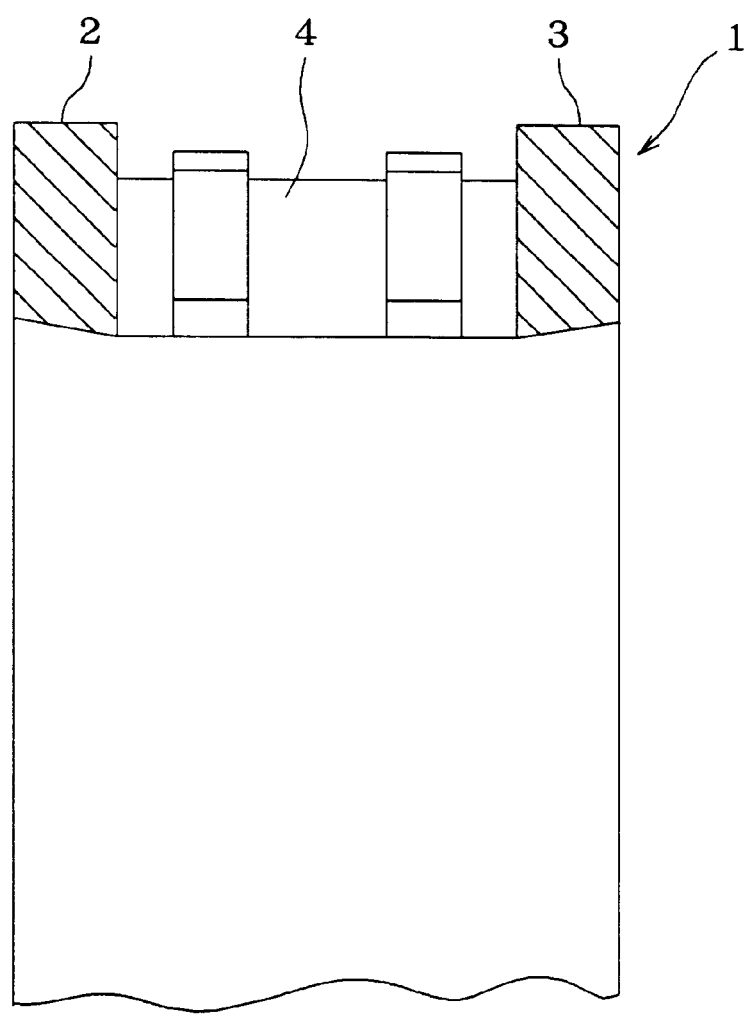
FIG. 31 is a cross sectional view of one half of a conventional synthetic resin cage for the cylindrical roller bearing.

The inventors tested and compared the lubrication during actual operation of a cylindrical roller bearing assembled with the synthetic resin cage 1d of this invention with a cylindrical roller bearing assembled with the conventional synthetic resin cage 1, shown in FIG. 31. As a result of this testing, it was found that the cylindrical roller bearing assembled with the synthetic resin cage 1d of this invention was capable of operation at much higher speeds with small amount of lubrication when compared with that of the cylindrical roller bearing assembled with the conventional synthetic resin cage 1.

The testing was performed under the conditions described below;

The speed of the rotating shaft, around which the inner race was affixed, was gradually increased in steps, making sure that the temperature came to equilibrium at each rpm. At the rpm where the temperature became unstable was taken to be the maximum allowable rpm.

Figure 25:
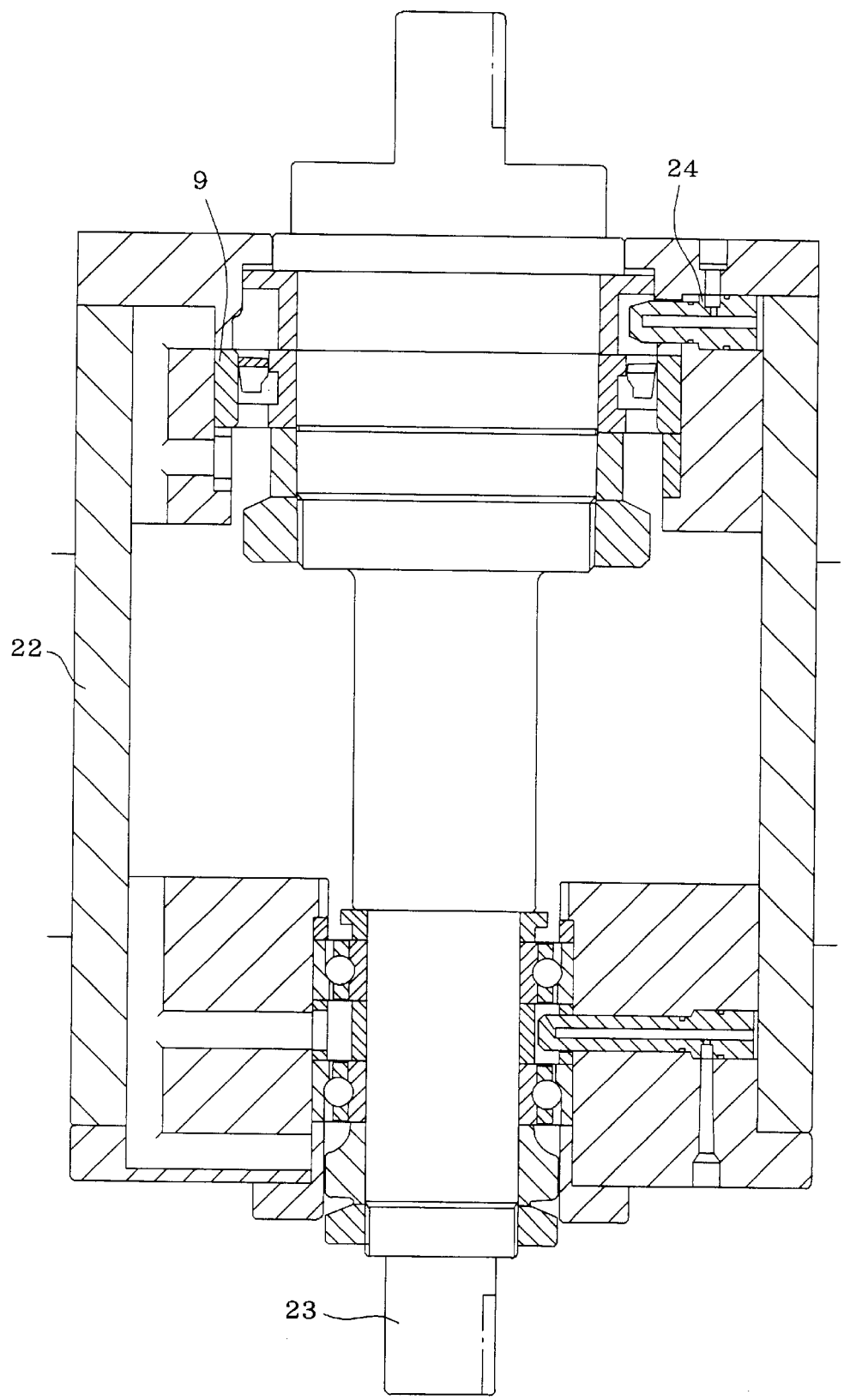
FIG. 25 is a cross sectional view of an experiment apparatus used to judge good or poor in lubrication condition.

Test Conditions
Cylindrical roller bearing used: N1014
  Inner diameter: 70 mm, 1/12 tapered hole,
  Outer diameter: 110 mm,
  Width: 20 mm,
  Roller size: 9 mm (Dia.)×9 mm (Length)
Cage dimensions,
  Outer diameter: 97 mm,
  Ouer diameter: 87 mm,
  Axial thickness of circular ring section in axial direction: 2.3 mm,
  Length of columns 6.3 mm (70% length of rollers in the axial direction)
Cage material: Polyamide 46 containing 30% weight of glass fibers FIG. 25 shows the construction of the test apparatus used in the test. Of the multiple rolling bearings used for supporting the rotating shaft 23 inside the housing 22, the top rolling bearing was a single-row cylindrical bearing 9 for test specimen, and a small amount of lubrication oil was supplied to this single-row cylindrical bearing 9.

Figure 23:
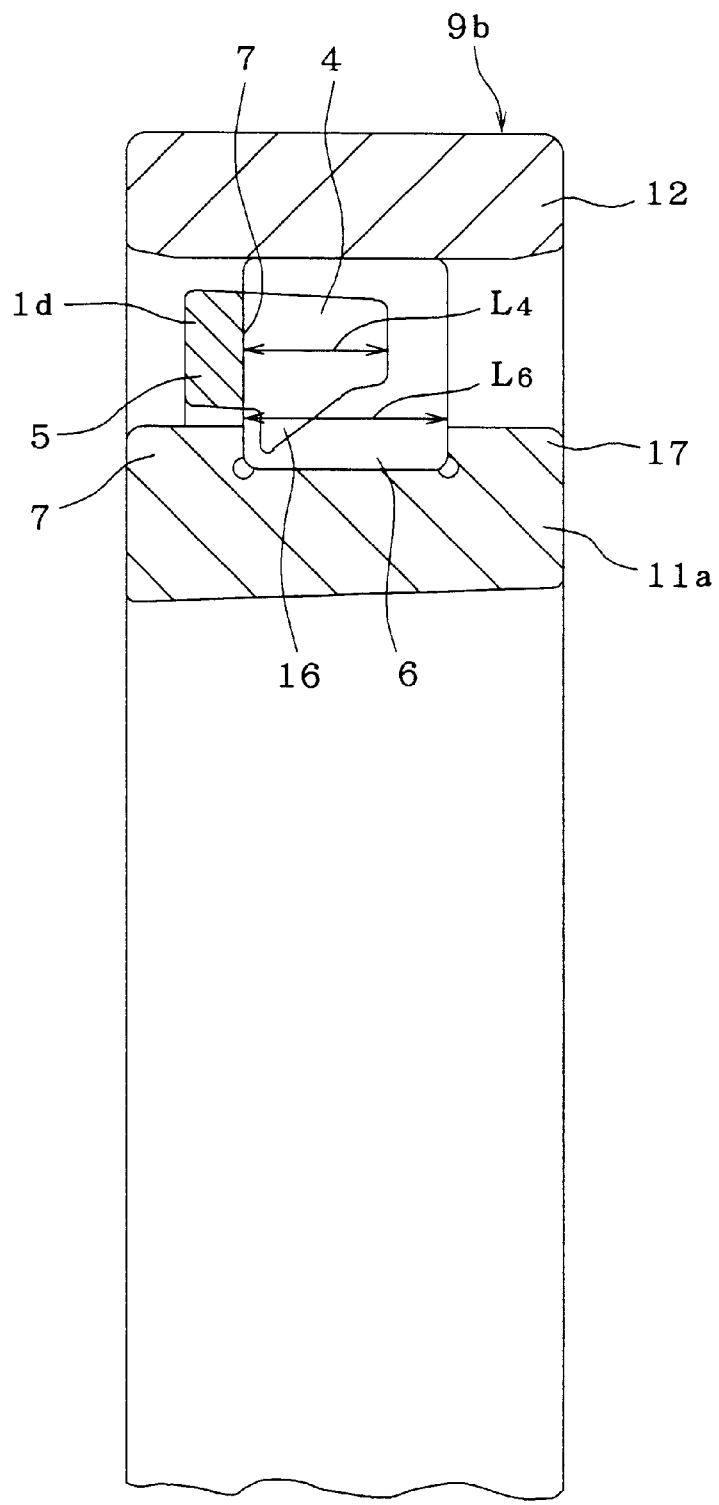
FIG. 23 is a cross sectional view of one half of a cylindrical roller bearing using a synthetic resin cage having columns with a desirable length.

The lubrication conditions used was "lubrication by oil air" sprayed from a nozzle 24, and this nozzle 24 was pointed at the single-row cylindrical bearing 9 and supplied it with oil air containing VG32 turbine oil, such that the amount of turbine oil supplied was 001 cc every 16 minutes. This same testing was performed for a cylindlical roller bearing assembled with the synthetic resin cage 1d of this invention, as shown in FIG. 23, and a cylindrical roller bearing assembled with a conventional synthetic resin cage, as shown in FIG. 31.

Figure 26:
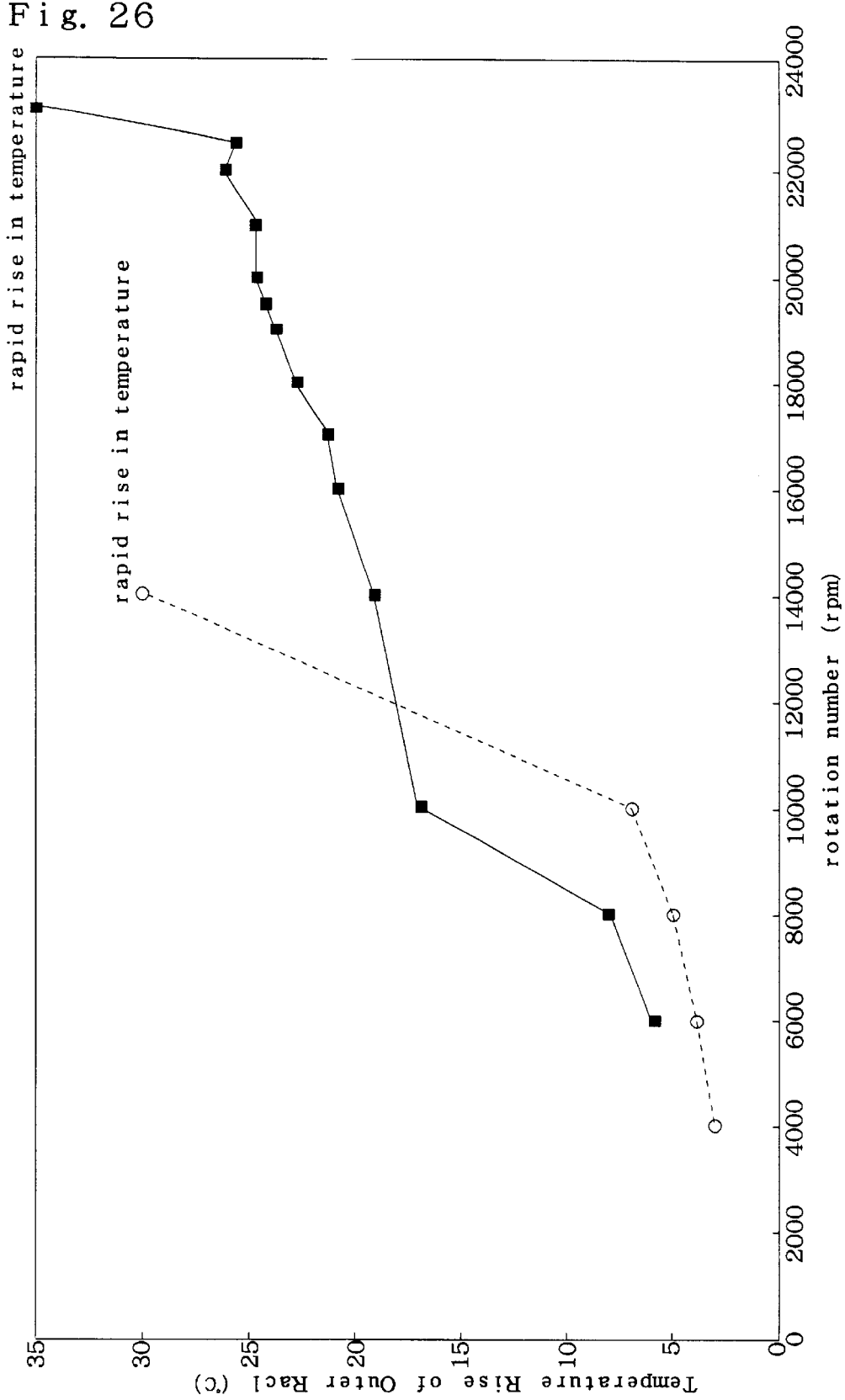
FIG. 26 is a diagram to show an experiment result on judging good or poor in lubrication condition.

The results of the test are shown in FIG. 26. In FIG. 26, the solid line a shows the test results for the cylindrical roller bearing assembled with the synthetic resin cage 1d of this invention, and the dashed line β shows the test results for the cylindrical roller bearing assembled with the conventional synthetic resin cage 1.

As can be seen from the test results in FIG. 26, the cylindrical roller bearing assembled with the synthetic resin cage id of this invention, was able to markedly attain greater cage speed than the cylindrical roller bearing assembled with the conventional synthetic resin cage 1.

It is thought that the reasons for this are as follows.

The method of supplying small amounts of lubrication was by oil air lubrication or oil mist lubrication where a small amount of oil was mixed with a large amount of compressed air and then sprayed onto the rolling bearing. Therefore, it is necessary the small amount of lubrication oil is able to actually reach inside the rolling bearing, and it must be discharged quickly in order that the oil reaching the bearing does not cause agitation resistance inside the rolling bearing.

In the cylindrical roller bearing assembled with the synthetic resin cage which is the object of this invention, the supply and discharge of lubrication oil is inferior when compared with that of a ball bearing, however, since in the synthetic resin cage 1d of this invention, only the base end of the columns 4 are supported using a cantilever method by the circular ring section 5, the section covering the rollers 6 is less in area than for the conventional synthetic resin cage 1 in which both ends of the columns 4 are supported, and thus there is a increase of oil supply and discharge Therefore, it is thought that this invention was able to show superior temperature stability during high-speed operation with small amount of lubrication.

From the testing described above, it was found that even though the synthetic resin cage is guided by the rollers 6 (in order that it only comes in contact with the rollers 6 during operation, the dimensions of the clearances between the inner and outer peripheral surfaces of the synthetic resin cage and the outer peripheral surface of the inner race and the inner peripheral surface of the outer race are set properly), the circular ring section 5 may deform into an elliptical shape during operation, and the inner and outer peripheral surfaces of this circular ring section 5 may come in contact with the outer peripheral surface of the inner race or the inner peripheral surface of the outer race. In the case of a cylindrical bearing which uses a synthetic resin cage that is guided by rollers 6, the outer peripheral surface portion of the rim sections 17, that are separated from the inner-raceway on the outer peripheral surface of the inner race, essentially did not interfere with any of the other parts, so normally no special consideration was given to their finished condition, and they may have been left as a surface with a large roughness just after cutting process by turning or as a heat treated surface.

However, from this experiment, in the synthetic resin cage 1d of this invention where only the base end of the columns 4 is supported with a cantilever method by the circular ring section 5, although the synthetic resin cage 1d was guided by the rollers 6, it is best if at least the outer peripheral surface of the rim section 17 that faces the inner surface of the circular ring section 5 be finished with a grinding process to improve the roughness of the surface.

In other words, by improving the roughness of the surface, even if there is interference between the inner peripheral surface of the circular ring section 5 of the synthetic resin cage 1d and the outer peripheral surface of the rim section 17, there is very little friction resistance at the point of contact of these two peripheral surfaces, and thus it is possible to prevent the problems of wear and heat. In this case, from the point of preventing wear and rise in cost, it is best if the roughness of the outer peripheral surface of the rim section 17 is between 1S and 3s.

Figure 27:
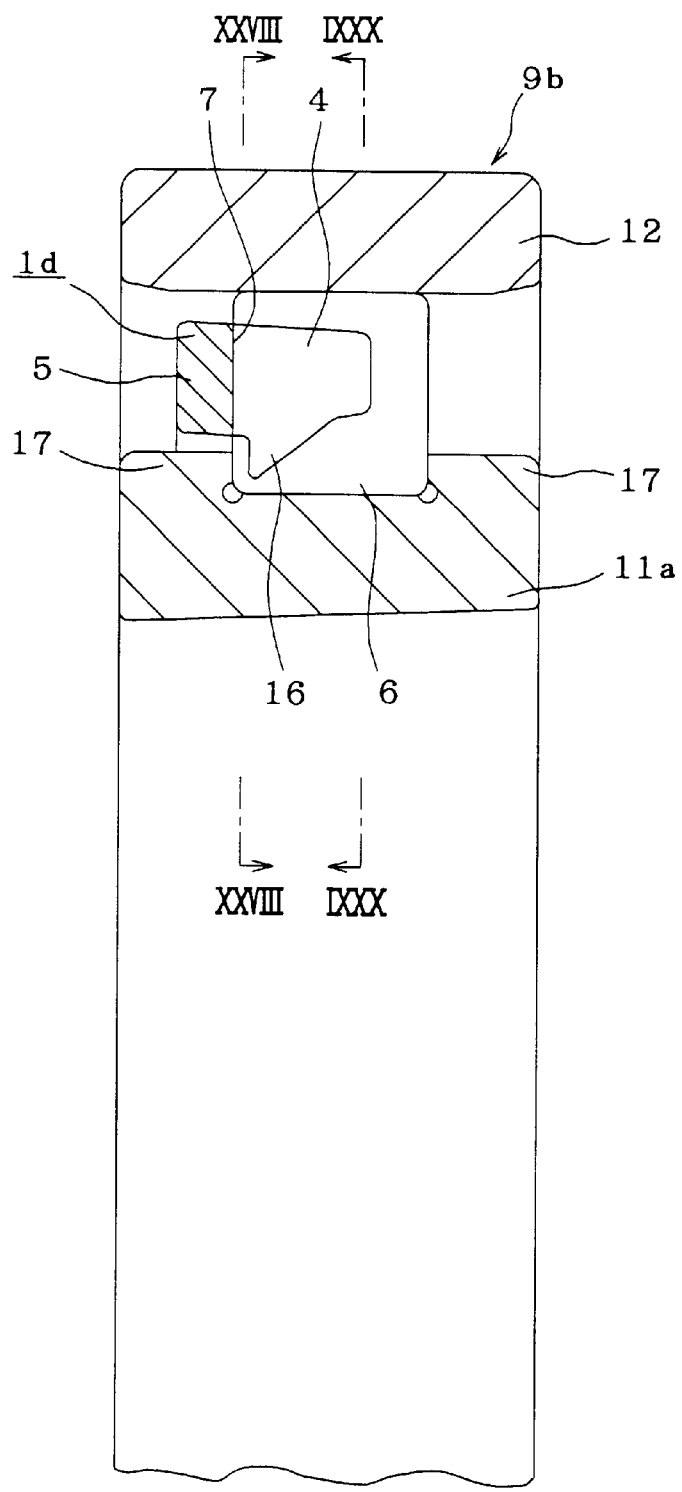
FIG. 27 is a cross sectional view of one half of a cylindrical roller bearing using a synthetic resin cage having columns titled taking elastic deformation into consideration.
Figure 28:
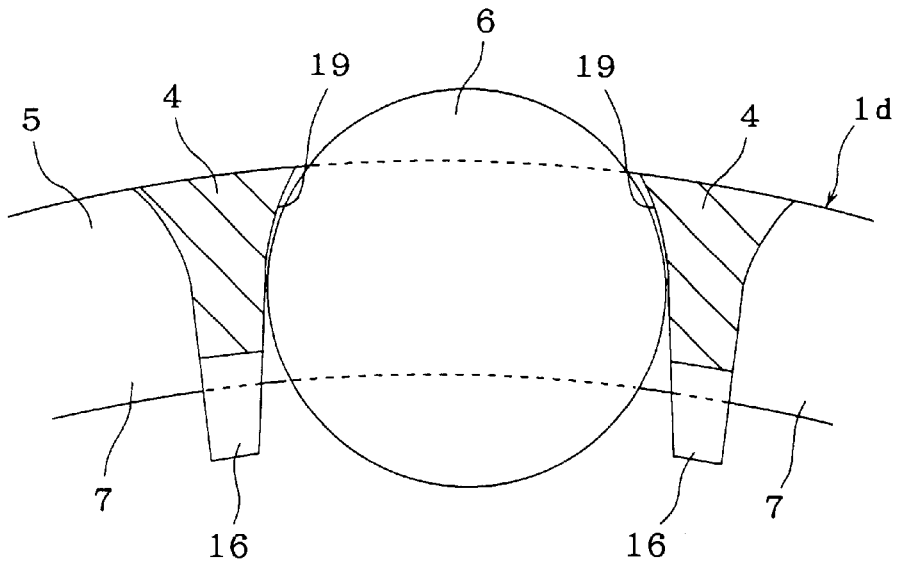
FIG. 28 is a cross sectional view taken along the line XXVIII—XXVIII of FIG. 27 to show the relation between the side faces of the columns and the rolling surface of the roller.
Figure 29:
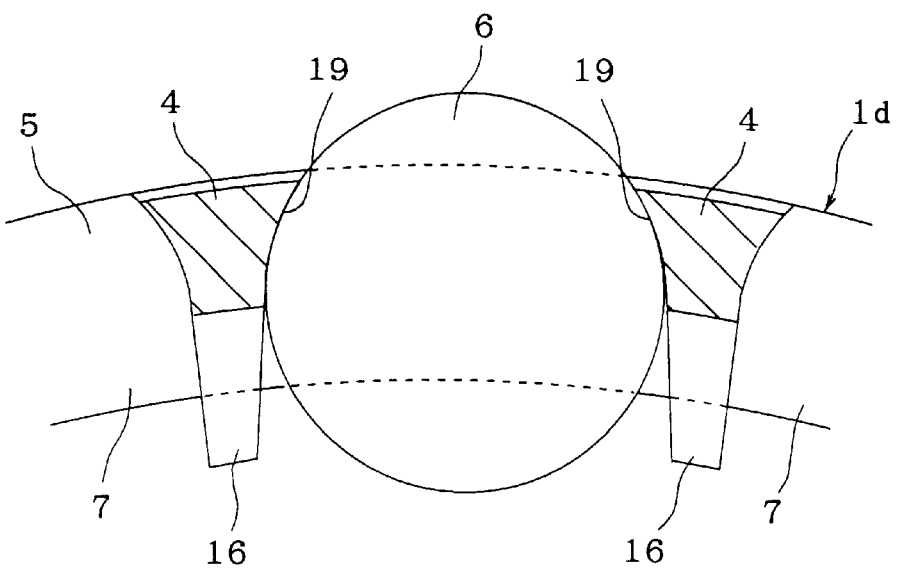
FIG. 29 is a cross sectional view taken along the line IXXX—IXXX of FIG. 27.

Next, the direction of the columns 4 will be discussed using FIGS. 27 to 29. If these colts are constructed such that they are parallel with each other and perpendicular to with respect to the circular ring section 5, as was mentioned before in the description of FIG. 21, if a column is deformed elastically by the weight of a roller 6 while assembling the cylindrical roller bearing, it becomes easy for the rollers 6 to drop out of the pockets 7. Therefore, if the columns 4 are constructed so that they are tilted such that the closer to its tip end the more inward in the radial direction of the synthetic resin cage 1d, as shown in FIG. 27, then even if the columns 4 are deformed elastically by the weight of a roller 6 while assembling the cylindrical roller bearing, it is difficult for the roller 6 to drop out of the pocket 7.

Moreover, even if the columns 4 deform elastically outward in the radial direction of the synthetic resin cage 1d during high-speed operation, it is difficult for the outer peripheral edges on the tip ends of the columns 4 to interfere with the inner peripheral surface of the outer race 12.

The tilting angle of the columns 4 (amount of tilt of the columns 4) with respect to the center axis of the synthetic resin cage 1d when no external forces are acting on the cage depends on the clearance between the curved surfaces 19 of the pockets 7 and the rolling surface of the rollers 6, and it is equal to or a little larger than the amount of movement of the synthetic resin cage 1d in the radial direction of the cage with respect to the rollers 6. If the amount of tilt of the columns 4 is not enough, then if the columns 4 are deformed elastically by the weight of the rollers 6, it may not be sufficient in preventing the rollers 6 from drop out. On the other hand, if the tilt is too large, then if the centrifugal force acting on the columns 4 is limited, the tip ends of the columns 4 restrict the rollers 6 and heat generated inside the cylindrical roller berg increases.

If the tilt of the columns 4 are set at a proper value, as described above, then there is no problem with the tip end of the columns 4 restricting the rollers 6. When the cylindrical roller bearing is stopped, there is a gap that exists between the side surfaces of the columns 4 near the base end and the rolling surface of the rollers 6, as shown in FIG. 28, however, the side surfaces of the columns 4 near the tip ends are very near or even come in contact with the rolling surface of the rollers 6, as shown in FIG. 29. As a result of the side surfaces on the tip ends of the columns 4 coming in contact with the rolling surface of the rollers 6, even if the tip ends of the columns 4 restrict the rollers 6 a little, when the columns 4 are deformed elastically by the centrifugal force that occurs when the cylindrical roller bearing is rotating, the tip ends of the columns 4 move away from the rollers 6. Moreover, if the maximum speed of rotation is known, then it is possible to take into consideration the amount of deformation of the columns due to the centrifugal force at maximum speed, and to set the amount of tilt of the columns 4 so that it is approximately equal to the amount of movement of the cage plus the amount of deformation.

By setting the amount of tilt of the columns 4 in this way, the amount that the columns 4 deform elastically due to centrifugal force at low speed is small, so it is possible that the tip ends of the columns 4 may restrict the rollers 6, however at low speed, since the friction speed between the columns 4 and rollers 6 at low speed is low, and since the heat generated at the point of contact between the rollers 6 and the surface of the raceway surface, the amount of heat generated by the cylindrical roller beaming in general is low when compared with during high-speed operation, and so poses no particular problem.

Next, the desired shape of both the inner and outer peripheral surfaces of the columns 4 and circular ring section 5 will be discussed. In the case of the synthetic resin cage 1d of this invention where only the base end of the columns 4 are supported using a cantilever method by the circular ring section 5, it is best to make the cross-sectional area of the circular ring section 5 as large as possible in order to improve its rigidity and strength.

On the other hand, in order to be able to suppress the elastic deformation of the columns 4 due to the centrifugal force at the support point where they connect with the circular ring section 5 low and to be able to operate at higher speeds, it is best if the cross-sectional area of the tip ends of the columns 4 be as small as possible.

Figure 30:
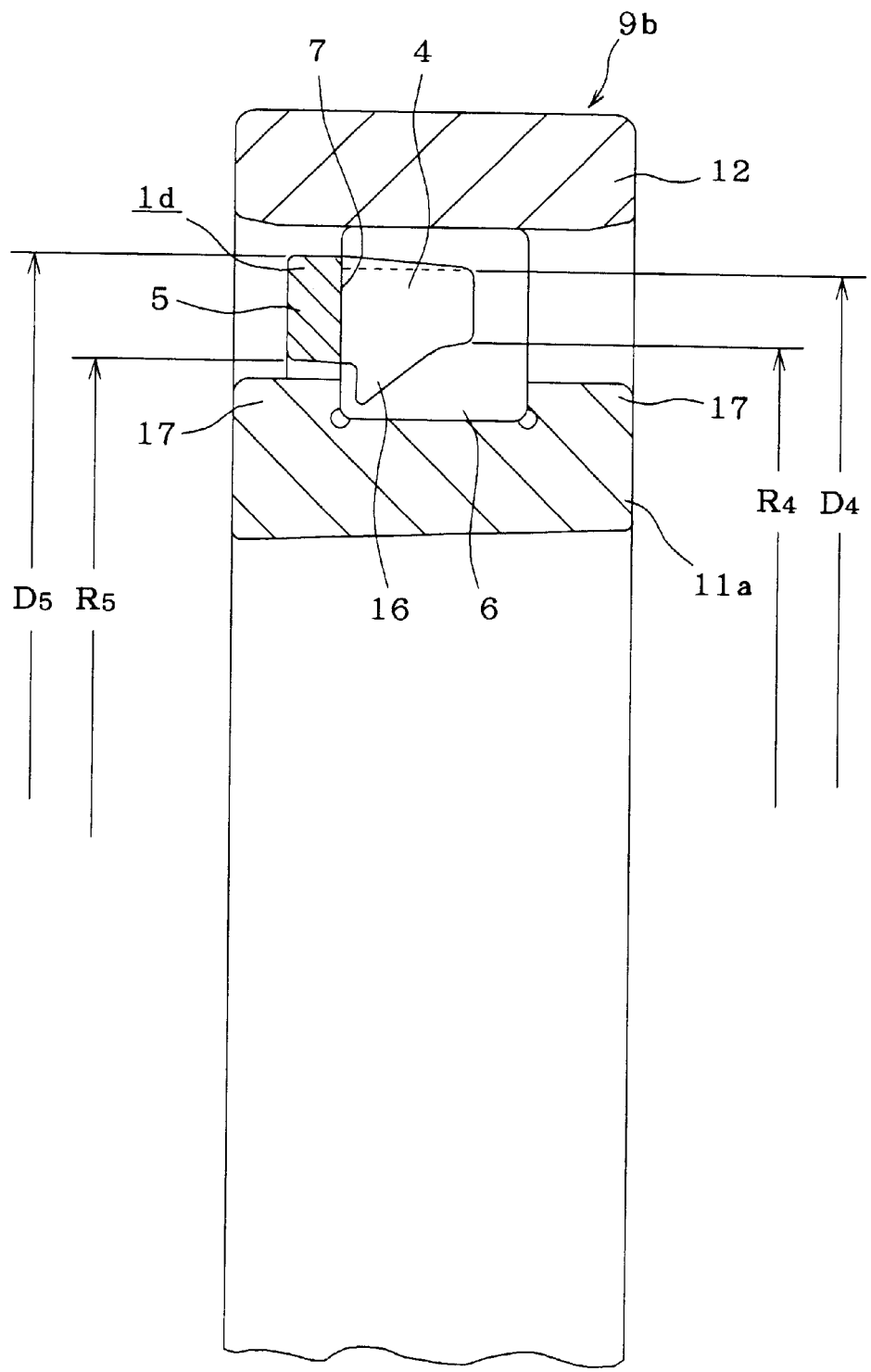
FIG. 30 is a cross sectional view of one half of a cylindrical roller bearing to show a desirable shape of the outer and inner peripheral surfaces of the columns of a synthetic resin cage.

Taking this into consideration, it is best for the synthetic resin cage 1d of this invention to have a shape as that shown in FIG. 30. In other words, for the outer diameter dimensions, if the outer diameter of the circular ring section 5 is taken to be $D_5$ and the outer diameter at the tip end of the columns 4 is taken to be $D_4$, then $D_5 > D_4$. On the other hand, for the inner diameter dimensions, if the inner diameter of the circular ring section 5 is taken to be $R_5$ and the inner diameter of the tip end of the columns 4 is taken to be $R_4$, then $R_5 < R_4$. By regulating the dimensional relationship in this way, it is possible to maintain the rigidity and strength of the circular ring section 5, as well as make it difficult for the outer peripheral edge on the tip ends of the columns 4 to interfere with the inner peripheral surface of the outer race 12 regardless of whether there is deformation due to the centrifugal force during high-speed operation.

In order to satisfy the relationship of $D_5 > D_4$, the outer peripheral surface of the columns 4 is tilted with respect to the center axis of the synthetic resin cage 1d, and the angle of tilt is best to be within 2 to 4 degrees. As described above using FIG. 27, by setting the amount of tilt of the columns 4, then the angle of tilt of the outer peripheral surface of the columns 4 becomes the total of the angle of tilt plus the aforementioned 2 to 4 degrees.

The synthetic resin cage for roller bearing of this invention is constructed and functions as described above, so even if there are changes in operating conditions. such as the assembly state of the roller bearing, it is possible to keep the abnormal stresses occur inside the cage to a minimum. Moreover, it is possible to stably operate at high speed for long periods of time machinery which has a support section comprising a roller bearing assembled with this synthetic resin cage without damaging the cage.

What is claimed is:

1. A roller bearing comprising:
    an inner race,
    an outer race,
    cylindrical rollers provided between the inner and outer races, and
    a synthetic resin cage for retaining the rollers,
    wherein the synthetic resin cage comprises:
        a circular ring section with an inner side surface provided at an axial one end of the cage,
        a column section formed with a plurality of elastically deformable columns arranged with a uniform interval in a circumferential direction,
        the columns being connected to and extending from the inner side surface of the circular ring section but free at their other ends, and having opposite side surfaces with a space therebetween in the circumferential direction such that a plurality of pockets are respectively defined on three sides by the circumferentially opposed side Surfaces of the adjacent columns and the inner side surface oil the circular ring section rotatably to support a respective roller therein,
    wherein each roller has an outer diameters the pockets define radially outer and inner openings, and the space between the circumferentially opposed side surfaces of the adjacent columns from a radially middle portion thereof to the radially inner opening has a circumferential width larger in size than the outer diameter of each roller, and
    a small number of the columns are provided with means to prevent the respective rollers from axially coming out of the pockets.

2. A roller bearing as claimed in claim 1, wherein the means to prevent the rollers from axially coming out of the pockets comprises a retaining piece interconnecting a pair of adjacent columns at their free ends.

3. A roller bearing as claimed in claim 2, wherein the radially outer opening of the pockets has a circumferential width which is smaller than the outer diameter of each roller being in the range of 0.7 to 0.9 times the roller diameter.

4. A roller bearing as claimed in claim 1, and further comprising an anchoring portion on a peripheral surface of selected columns to be engaged with part of a race of the roller bearing.

5. A roller bearing, as claimed in claim 4, wherein the radially outer opening of the pockets has a circumferential width which is smaller than the outer diameter of each roller being in the range of 0.7 to 0.9 times the roller diameter.

6. A roller bearing as claimed in claim 1, wherein the means to prevent the rollers from axially coming out of the pockets comprises a retaining piece extending from a column at its free end to be engaged with part of the rollers.

7. A roller bearing as claimed in claim 6, wherein the radially outer opening of the pockets has a circumferential width which is smaller than the outer diameter of each roller being in the range of 0.7 to 0.9 times the roller diameter.

8. A roller bearing as claimed in claim 1, wherein the radially outer opening of the pockets has a circumferential width which is smaller than the outer diameter of each roller being in the range of 0.7 to 0.9 times the roller diameter.

* * * * *